United States Patent
Kato et al.

(10) Patent No.: US 10,116,808 B2
(45) Date of Patent: Oct. 30, 2018

(54) MOVING AMOUNT DETECTOR AND IMAGE FORMING APPARATUS INCLUDING THE SAME

(71) Applicant: Konica Minolta, Inc., Chiyoda-ku, Tokyo (JP)

(72) Inventors: Takaki Kato, Toyokawa (JP); Masayuki Fukunaga, Toyohashi (JP); Yuji Kobayashi, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/270,456

(22) Filed: Sep. 20, 2016

(65) Prior Publication Data
US 2017/0094071 A1    Mar. 30, 2017

(30) Foreign Application Priority Data

Sep. 29, 2015 (JP) ................................. 2015-191262

(51) Int. Cl.
*H04N 1/00* (2006.01)
*G06K 15/16* (2006.01)
(Continued)

(52) U.S. Cl.
CPC ......... *H04N 1/00068* (2013.01); *G06K 15/16* (2013.01); *G06T 7/262* (2017.01);
(Continued)

(58) Field of Classification Search
CPC ................................................ H04N 1/00068
(Continued)

(56) References Cited

U.S. PATENT DOCUMENTS

| 6,311,019 B1 * | 10/2001 | Ide | ........................... | G02B 7/34 |
| | | | | 396/104 |
| 2007/0007925 A1 * | 1/2007 | Yamane | .................... | B41J 29/38 |
| | | | | 318/600 |

(Continued)

FOREIGN PATENT DOCUMENTS

| JP | 2007-254094 | 10/2007 |
| JP | 2013231658 A | 11/2013 |

(Continued)

OTHER PUBLICATIONS

Notification of Reasons for Refusal issued in corresponding Japanese Patent Application No. 2015-191262, dated Dec. 12, 2017, with English Translation (8 pages).

(Continued)

*Primary Examiner* — Jacky X Zheng
(74) *Attorney, Agent, or Firm* — Buchanan Ingersoll & Rooney PC

(57) ABSTRACT

A moving amount detector that sets a movable member included in a device of a mounting destination or an object conveyed by the device as a detection target and detects a moving amount of the detection target includes: an imaging unit that repeatedly captures images of the detection target at a constant sampling period while the detection target moves; and a moving amount calculating unit that selects two images to be compared with each other among a series of images of the detection target captured by the imaging unit such that an imaging time difference between the two images is increased as a difference due to moving of the detection target is further generated between the two images and calculates a moving amount of the detection target based on the difference.

20 Claims, 16 Drawing Sheets

(51) Int. Cl.
*H04N 1/12* (2006.01)
*G06T 7/262* (2017.01)

(52) U.S. Cl.
CPC ..... *H04N 1/00037* (2013.01); *H04N 1/00251* (2013.01); *H04N 1/12* (2013.01); *G06T 2207/10016* (2013.01); *G06T 2207/20056* (2013.01); *H04N 2201/0084* (2013.01); *H04N 2201/0094* (2013.01)

(58) Field of Classification Search
USPC ....................................................... 358/1.12
See application file for complete search history.

(56) References Cited

U.S. PATENT DOCUMENTS

2007/0247636 A1* 10/2007 Matsuoka ................ G01P 3/36
356/498
2010/0202661 A1 8/2010 Mizutani

FOREIGN PATENT DOCUMENTS

| | | |
|---|---|---|
| JP | 2014-052437 A | 3/2014 |
| JP | 2014-159323 A | 9/2014 |
| JP | 2015-068809 A | 4/2015 |
| WO | 2009/078056 | 6/2009 |

OTHER PUBLICATIONS

Office Action (Notice of Reasons for Rejection) dated Jun. 28, 2018, by the Japanese Patent Office in corresponding Japanese Patent Application No. 2015-191262, and an English Translation of the Office Action. (9 pages).

* cited by examiner

FIG. 11A  $v_S=300$mm/s, $\Delta t=1$ms
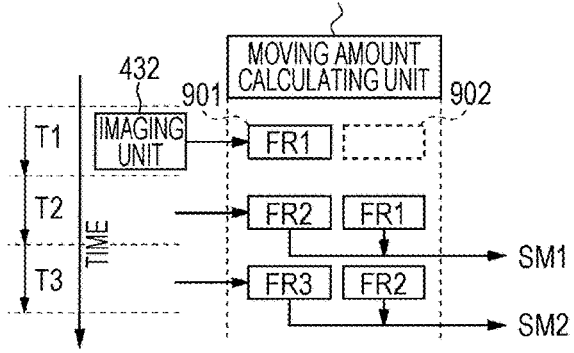
FIG. 11B  $v_S=150$mm/s, $\Delta t=2$ms
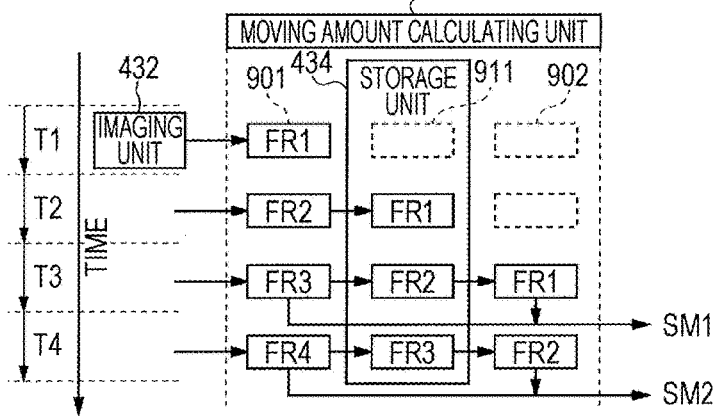
FIG. 11C  $v_S=100$mm/s, $\Delta t=3$ms
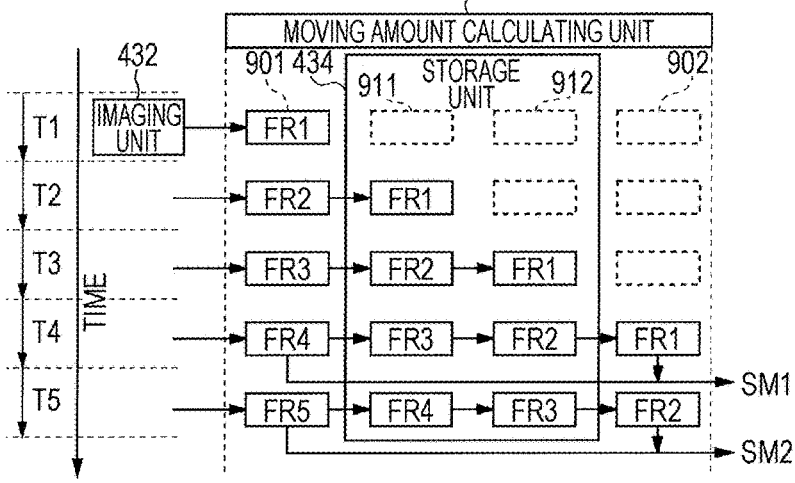

MOVING AMOUNT DETECTOR AND IMAGE FORMING APPARATUS INCLUDING THE SAME

The entire disclosure of Japanese Patent Application No. 2015-191262 filed on Sep. 29, 2015 including description, claims, drawings, and abstract are incorporated herein by reference in its entirety.

BACKGROUND OF THE INVENTION

Field of the Invention

The present invention relates to drive control of a movable member or conveyance control of an object, and more particularly, to a technology for detecting a moving amount of a movable member or an object.

Description of the Related Art

The implementation of a further high speed is requested for image forming apparatuses such as a printer and a copy machine. On the other hand, it is naturally requested to maintain the printing quality to be the original quality or higher. In order to deal with such contradictory requests, drive control of movable members including conveyance rollers and image carrying rotary bodies such as a photosensitive drum and an intermediate transfer belt and conveyance control of sheets need to be more accurate.

As one of devices for further improving the accuracy of such control, it may be considered that the positions or the speeds of movable members, sheets, and the like are detected at a higher speed with higher accuracy and are fed back to such control systems. For this, it is necessary to devise a technology for detecting the moving amounts of detection targets with higher accuracy in real time.

For the detection of the moving amounts at a high speed with high accuracy, optical detectors are advantageous. As main principles of the operation thereof, the following three types are known. A detector of a first type, like a rotary encoder or the like, determines the position of a detection target based on a change in the amount of light that is caused by the detection target blocking or transmitting light transmitted from a light source toward an optical detector (for example, see JP 2014-159323 A). A detector of a second type repeatedly captures images of a detection target using an imaging device such as a complementary metal-oxide-semiconductor field-effect transistor (CMOS) or a charge coupled device (CCD) and calculates the moving amount of the detection target based on a change in consecutive two images (for example, see JP 2014-052437 A and JP 2015-068809 A). A detector of a third type calculates the speed of a detection target based on a change between the frequencies of emission light emitted toward the detection target and reflection light reflected by the detection target that is caused by a Doppler effect.

Particularly, the detector of the second type can detect the moving amount of a detection target with higher accuracy as the structure of the detection target is finer. Accordingly, the detector of such a type captures an image of shades or speckles caused by fine (for example, about several μm) irregularities of the surface of the detection target by using a light emitting diode (LED) or semiconductor laser as a light source. Between consecutive two images, brightness distributions representing the patterns of the shades or the speckles are correlated, and a peak of a correlation coefficient is displaced according to the movement of the detection target. The detector of the second type measures the amount of the displacement in pixel pitches and calculates the product of a measured value and the magnification of the imaging optical system as the moving amount of the detection target.

The detector of the second type can finely configure the measurement precision of the peak displacement of the correlation coefficient up to a sub pixel size by performing a sub pixel process for brightness distributions measured in pixel pitches (for example, see JP 2015-068809 A). In the "sub pixel process", brightness of an image output in the pixel pitch is interpolated between pixels adjacent to each other, and accordingly, a brightness change in the sub pixel pitch (for example, $\frac{1}{10}$ of the pixel pitch) is estimated.

The moving amount detector of the second type, as described above, calculates the moving amount of a detection target based on a displacement amount of a peak of the correlation coefficient between two consecutive images. This displacement amount can be identified at the pitch of a pixel or a sub pixel of an imaging device, and a lower limit of a detectable moving amount is the product of the size of the pixel or the like and the magnification of an imaging optical system. This means that at least a time for a detection target image to move the size of the pixel or the like within an imaging device is necessary. In other words, in a case where an interval (hereinafter, referred to as a "sampling period") of the imaging time of an image is shorter than this time, the moving amount cannot be detected based on the two consecutive images. Thus, in a case where the moving amount detector of the second type is used for the drive control of movable members or the conveyance control of sheets in an image forming apparatus, there are the following problems.

The image forming apparatus changes the conveyance speed of a sheet based on the sheet type or the thickness of the sheet. For example, a cardboard is conveyed at a speed lower than the speed of a plain sheet. The main reason for this is that the power consumption of a drive motor of the conveyance rollers and the like is stabilized regardless of a weight of a conveyance target sheet. In a case where the conveyance speed of a sheet is decreased, the transfer timing of a toner image from an image carrying rotary body onto the sheet is delayed, and accordingly, the image forming apparatus decreases also the processing speed of image generation and the like. In other words, together with the moving speed of the movable members contributing to the conveyance of a sheet such as the rotation speed of the conveyance roller, the moving speed of movable members contributing to the process of image generation and the like such as the rotation speed of a photosensitive drum and an intermediate transfer belt is decreased. As a result, a time required for a detection target image to move the size of a pixel or the like within the moving amount detector increases. In a case where this moving time exceeds the sampling period, the moving amount of a detection target cannot be detected based on a change between two consecutive images, and accordingly, a conventional moving amount detector needs to increase the sampling period such that a change appears between two consecutive images. In accordance with this, a time interval at which a subject of the conveyance control of a sheet or the drive control of a movable member receives feedback of the moving amount from this detector increases, and accordingly, such control may be easily delayed with respect to a load change. Accordingly, in a conventional detector, it is difficult to maintain responsiveness of the control to be good regardless of a decrease in the conveyance speed of a sheet by maintaining a feedback interval of the moving amount to be constant.

SUMMARY OF THE INVENTION

An object of the present invention is to solve the problems described above and particularly to provide a moving amount detector capable of maintaining the detection of a moving amount at a high speed regardless of the moving speed of a detection target.

To achieve the abovementioned object, according to an aspect, a moving amount detector that sets a movable member included in a device of a mounting destination or an object conveyed by the device as a detection target and detects a moving amount of the detection target, reflecting one aspect of the present invention comprises: an imaging unit that repeatedly captures images of the detection target at a constant sampling period while the detection target moves; and a moving amount calculating unit that selects two images to be compared with each other among a series of images of the detection target captured by the imaging unit such that an imaging time difference between the two images is increased as a difference due to moving of the detection target is further generated between the two images and calculates a moving amount of the detection target based on the difference.

The moving amount calculating unit preferably acquires information relating to a moving speed of the detection target from the device, determines an integer of one or more corresponding to an imaging sequence difference between the two images of a case where a difference due to the moving of the detection target is generated between the two images among the series of images in accordance with the moving speed represented by the information, and extracts and compares two images of which imaging sequences are different by the integer of one or more among the series of images.

The sampling period preferably represents a time required for an image of the detection target to move by a size of one pixel or one sub pixel inside the imaging unit in a case where the moving speed of the detection target is a reference value. In this case, the moving amount calculating unit preferably acquires a ratio of the reference value to a target value by decoding the target value of the moving speed of the detection target from the information and sets a minimum value among integers of the ratio or more as the integer of one or more.

The moving amount calculating unit preferably divides the series of images into image rows corresponding to a same number as the integer of one or more such that images having imaging sequences that are different from each other by each the integer of one or more belong to a same row and calculates the moving amount of the detection target based on a difference between consecutive two images in each of the image rows.

The moving amount calculating unit preferably further includes a storage unit that stores the series of images corresponding to a value acquired by decreasing the integer of one or more by one in an imaging sequence.

The moving amount calculating unit preferably repeats comparison of the series of images, two images at each time, while an imaging sequence difference between the two images to be compared with each other is increased. In this case, the moving amount calculating unit preferably acquires information relating to a moving speed of the detection target from the device and increases an imaging sequence difference between two images to be compared with each other among the series of images from a lower limit corresponding to a moving speed represented by the information. Furthermore, when the sampling period represents a time required for an image of the detection target to move by a size of one pixel or one sub pixel inside the imaging unit in a case where the moving speed of the detection target is a reference value, the moving amount calculating unit preferably acquires a ratio of the reference value to a target value by decoding the target value of the moving speed of the detection target from the information and sets a minimum value among integers of the ratio or more as the lower limit of the imaging sequence difference. The moving amount calculating unit, in a case where calculation of a value that is significantly different from "0" is successful as the moving amount of the detection target based on a difference between two images included in the series of images, preferably updates the lower limit with the imaging sequence difference between the two images.

The moving amount calculating unit preferably fixes an imaging time difference between two images to be compared with each other among the series of images in accordance with a user's operation received by the device.

To achieve the abovementioned object, according to an aspect, an image forming apparatus reflecting one aspect of the present invention comprises: a conveyance unit that conveys a sheet; an image generating unit that forms a toner image on an image carrying rotary body and transfers the toner image from the image carrying rotary body onto the sheet conveyed by the conveyance unit; a moving amount detector that detects a moving amount of the sheet conveyed by the conveyance unit or a rotation amount of the image carrying rotary body; and a control unit that controls the conveyance unit or the image generating unit based on the moving amount or the rotation amount detected by the moving amount detector, the moving amount detector including an imaging unit that repeatedly captures images of the sheet conveyed by the conveyance unit or the image carrying rotary body at a constant sampling period while the sheet conveyed by the conveyance unit or the image carrying rotary body is moved, and a moving amount calculating unit that selects two images to be compared with each other among a series of images of the sheet conveyed by the conveyance unit or the image carrying rotary body captured by the imaging unit such that an imaging time difference between the two images is increased as a difference due to moving of the sheet conveyed by the conveyance unit or the image carrying rotary body is further generated between the two images and calculates a moving amount of the sheet conveyed by the conveyance unit or the image carrying rotary body based on the difference.

The control unit preferably maintains at least one of information relating to image quality of the toner image, information relating to power consumption of the image forming apparatus, and information relating to a size of the sheet on which the toner image is to be formed. In this case, the moving amount calculating unit preferably fixes the imaging time difference between the two images to be compared with each other among the series of images in accordance with the information maintained by the control unit.

The moving amount calculating unit preferably acquires information relating to a moving speed of the detection target from the apparatus, determines an integer of one or more corresponding to an imaging sequence difference between two images of a case where a difference due to moving of the detection target is generated between the two images among the series of images in accordance with the moving speed represented by the information, and extracts and compares two images having an imaging sequence difference of the integer of one or more among the series of images.

The moving amount calculating unit preferably repeats comparison of the series of images, two images at each time while increasing the imaging sequence difference between the two images to be compared with each other.

To achieve the abovementioned object, according to an aspect, a method of detecting a moving amount for setting a movable member included in a device of a mounting destination or an object conveyed by the device as a detection target and detecting a moving amount of the detection target, reflecting one aspect of the present invention comprises: repeatedly capturing images of the detection target at a constant sampling period while the detection target moves; and selecting two images to be compared with each other among a series of images of the detection target captured in the repeatedly capturing of images of the detection target such that an imaging time difference between the two images is increased as a difference due to moving of the detection target is further generated between the two images and calculating a moving amount of the detection target based on the difference.

The calculating of the moving amount preferably includes: acquiring information relating to a moving speed of the detection target from the device; determining an integer of one or more corresponding to an imaging sequence difference between the two images of a case where a difference due to the moving of the detection target is generated between the two images among the series of images in accordance with the moving speed represented by the information; and extracting and comparing two images of which imaging sequences are different by the integer of one or more among the series of images.

In the calculating of the moving amount, comparison of the series of images, two images at each time is preferably repeated, while increasing the imaging sequence difference between the two images to be compared with each other.

To achieve the abovementioned object, according to an aspect, there is provided a non-transitory recording medium storing a computer readable program causing a computer to perform a process of setting a movable member included in a device of a mounting destination or an object conveyed by the device as a detection target and detecting a moving amount of the detection target, and the process reflecting one aspect of the present invention comprises: repeatedly capturing images of the detection target at a constant sampling period while the detection target moves; and selecting two images to be compared with each other among a series of captured images of the detection target such that an imaging time difference between the two images is increased as a difference due to moving of the detection target is further generated between the two images and calculating a moving amount of the detection target based on the difference.

The calculating of the moving amount preferably includes acquiring information relating to a moving speed of the detection target from the device, determining an integer of one or more corresponding to an imaging sequence difference between the two images of a case where a difference due to the moving of the detection target is generated between the two images among the series of images in accordance with the moving speed represented by the information, and extracting and comparing two images of which imaging sequences are different by the integer of one or more among the series of images.

In the calculating of the moving amount, comparison of the series of images, two images at each time is preferably repeated while increasing the imaging sequence difference between the two images to be compared with each other.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 11A, 11B, and 11C are schematic views that illustrate the appearances that the moving amount calculating unit moves a processing target frame between a frame memory and a storage unit in the parallel process illustrated in FIG. 8B in a case where target values of the conveyance speed of a sheet are 300 mm/s, 150 mm/s, and 100 mm/s;

DESCRIPTION OF THE PREFERRED EMBODIMENTS

Hereinafter, an embodiment of the present invention will be described with reference to the drawings. However, the scope of the invention is not limited to the illustrated examples.

<21 First Embodiment>>

[External View of Image Forming Apparatus]

Figure 1:
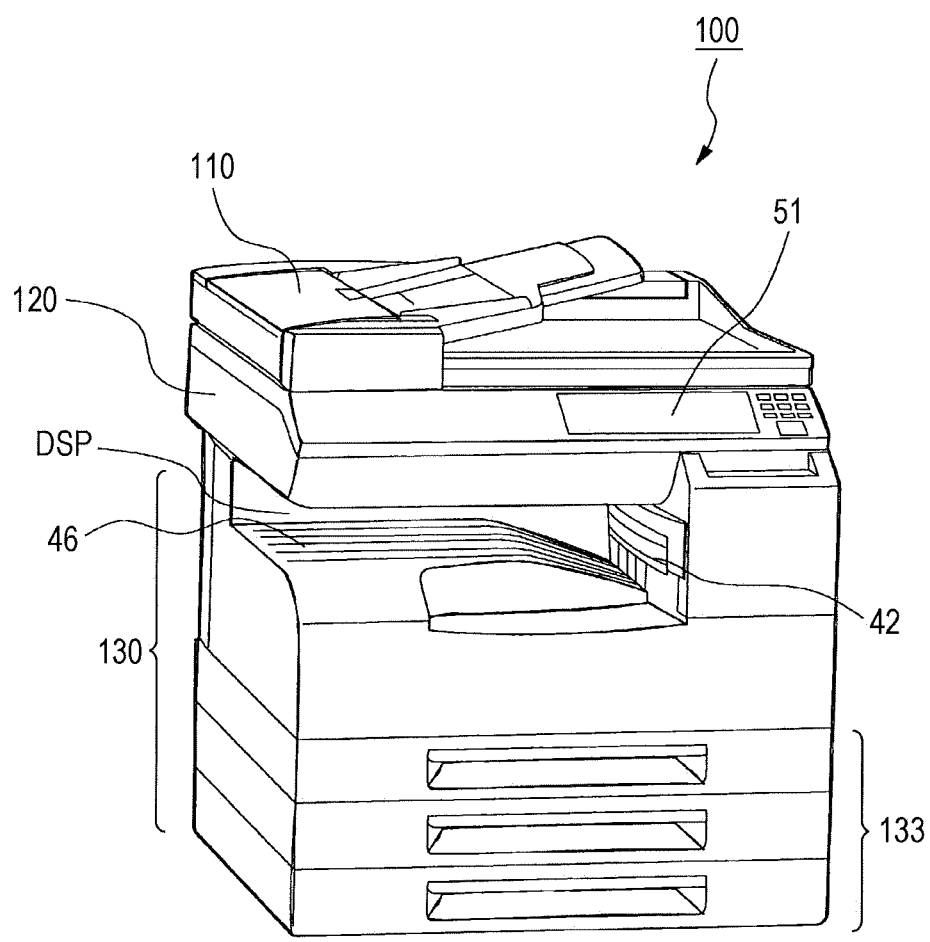
FIG. 1 is a perspective view that illustrates an external view of an image forming apparatus according to a first embodiment of the present invention.

FIG. 1 is a perspective view that illustrates an external view of an image forming apparatus according to the first embodiment of the present invention. This image forming apparatus 100 is a multi-function peripheral (MFP) and has all the functions of a scanner, a color copier, and a color laser printer. As illustrated in FIG. 1, on the upper face of a casing of the MFP 100, an auto document feeder (ADF) 110 is mounted to be open or closed, and an operation panel 51 is embedded in front thereof. In an upper part of the casing positioned right below the ADF 110, a scanner 120 is built in, and a printer 130 is built in a lower part of the casing. At the bottom of the printer 130, a sheet feeding cassette 133 is mounted to be extractable. The MFP 100 is an in-body sheet discharging type. In other words, in a space DSP between the scanner 120 and the printer 130, a sheet discharging tray 46 is disposed, and a discharged sheet is housed from a sheet discharging opening 42 disposed on the inner side of the space DSP.

[Internal Structure of Image Forming Apparatus]

Figure 2:
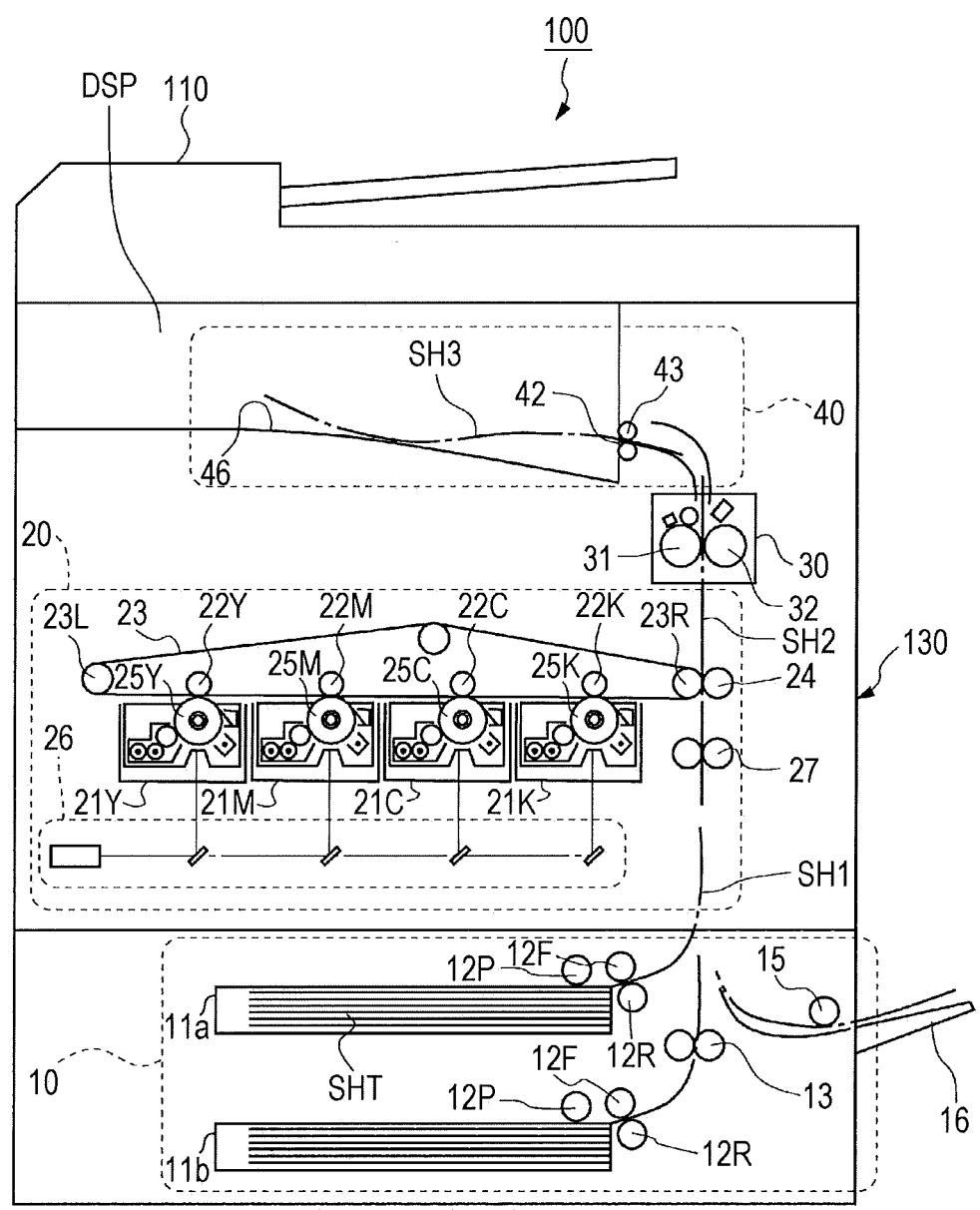
FIG. 2 is a front view that schematically illustrates the internal structure of a printer illustrated in FIG. 1.

FIG. 2 is a front view that schematically illustrates the internal structure of the printer 130. In FIG. 2, internal elements of the printer 130 are drawn as if the elements are seen through the front face of the casing. As illustrated in FIG. 2, the printer 130 includes: a feed unit 10; an image generating unit 20; a fixing unit 30; and a sheet discharging unit 40.

The feed unit 10, by using feed roller groups 12P, 12R, 12F, 13, and 15 delivers sheets SH1 from a bundle SHT of sheets housed in a sheet feeding cassette 11a or 11b or an input tray 16 one at each time and feeds the sheets to the image generating unit 20. The material of the sheet SHT that can be housed in the sheet feeding cassette 11 and the input tray 16 is paper, a resin, or the like and, the sheet type is a plain sheet, a high-quality sheet, a color sheet, a coated sheet, or the like, and the size is A3, A4, A5, B4, or the like. In addition, the posture of a sheet may be set to any one of vertical orientation and horizontal orientation.

The image generating unit 20 forms a toner image on a sheet SH2 sent from the feed unit 10. More specifically, a timing roller 27, first, temporarily stops one sheet among sheets of the sheet feeding cassettes 11a and 11b and the input tray 16 at the position. Next, the timing roller 27 passes the sheet to a nip between an intermediate transfer belt 23 and a secondary transfer roller 24 in accordance with timing represented by a drive signal transmitted from a main control unit 60 (see FIGS. 5A and 5B) to be described later. In parallel with the operation, four image generating units 21Y, 21M, 21C, and 21K, first, respectively expose the surfaces of photosensitive drums 25Y, 25M, 25C, and 25K into a pattern based on image data by using laser light transmitted from an exposure unit 26 and generates electrostatic latent images on the surfaces thereof. Next, the image generating units 21Y, . . . develop the electrostatic latent images using toner of colors Yellow (Y), magenta (M), cyan (C), and black (K). The acquired toner images of the four colors are sequentially transferred to a same position on the surface of the intermediate transfer belt 23 from the surfaces of the photosensitive drums 25Y, . . . in accordance with electric fields between primary transfer rollers 22Y, 22M, 22C, and 22K and the photosensitive drums 25Y, . . . . In this way, one color toner image is configured at the position. This color toner image is further transferred onto the surface of a sheet SH2 passing to the nip between both members 23 and 24 in accordance with an electric field between the intermediate transfer belt 23 and the secondary transfer roller 24. Thereafter, the secondary transfer roller 24 sends the sheet SH2 to a fixing unit 30.

The fixing unit 30 thermally fixes the toner image on the sheet SH2 sent from the image generating unit 20. More specifically, when the sheet SH2 is passed to a nip between a fixing roller 31 and a pressing roller 32, the fixing roller 31 applies heat of a built-in heater to the surface of the sheet SH2, and the pressing roller 32 applies pressure to a heated portion of the sheet SH2 so as to press the heated portion to the fixing roller 31. The toner image is fixed to the surface of the sheet SH2 by using heat from the fixing roller 31 and pressure from the pressing roller 32.

The sheet discharging unit 40 discharges a sheet to which the toner image is fixed to the sheet discharging tray 46. As illustrated in FIG. 2, the sheet discharging unit 40 includes a sheet discharging opening 42 and a sheet discharging roller 43. The sheet discharging opening 42 is a slit, which is long and thin in the horizontal direction, open for a casing portion of the MFP 100 brought into contact with the space DSP. The sheet discharging roller 43 is arranged inside the sheet discharging opening 42 and sends out the sheet SH3 moved from above the fixing unit 30 on the peripheral surface thereof from the sheet discharging opening 42 while rotating and is housed in the sheet discharging tray 46.

[Conveyance Path of Sheet]

Figure 3:
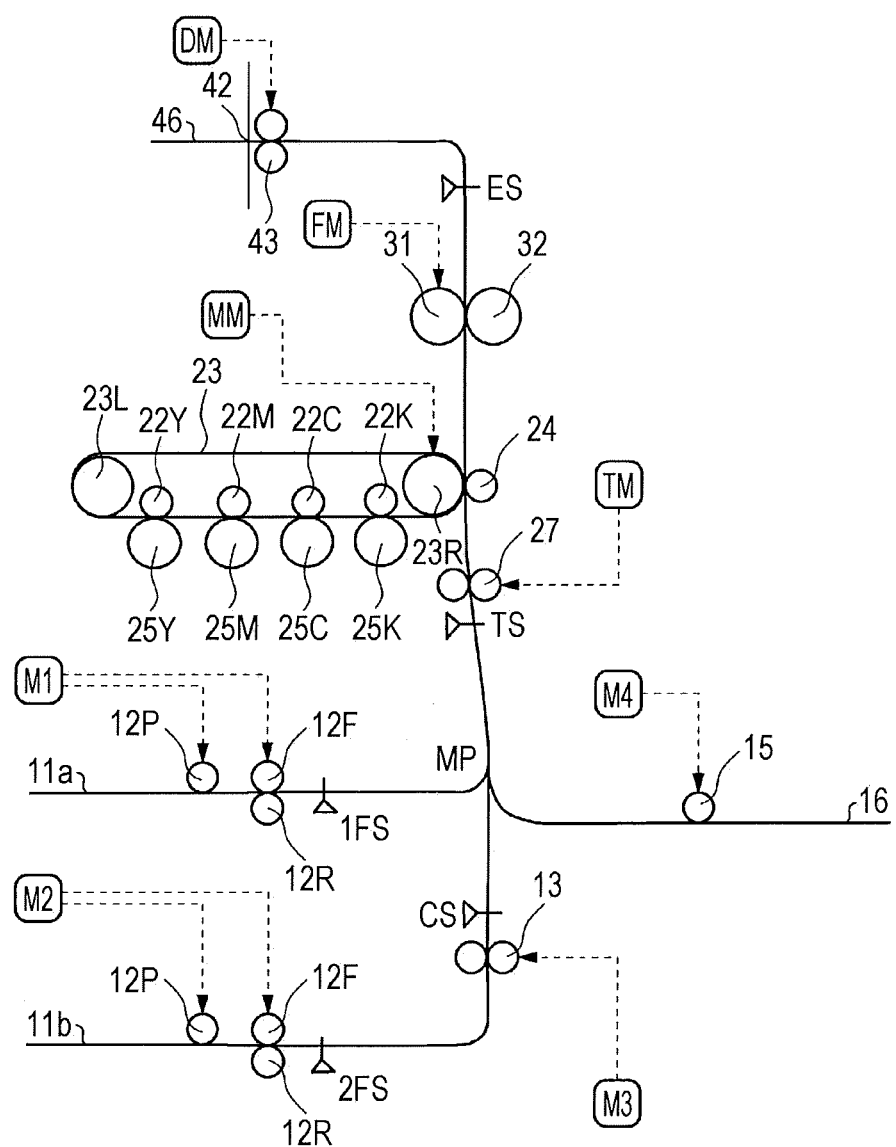
FIG. 3 is a schematic view that illustrates a conveyance path of a sheet loaded inside the image forming apparatus illustrated in FIG. 2.

FIG. 3 is a schematic view that illustrates a conveyance path of a sheet loaded inside the printer 130. As illustrated in FIG. 3, on this path, in addition to the conveyance roller groups 12P, . . . illustrated in FIG. 2, a plurality of optical sensors 1FS, 2FS, CS, TS, and ES are installed. Each of the optical sensors 1FS, . . . monitors a sheet passing through a near path portion. More specifically, each of the optical sensors 1FS, . . . includes a light emitting unit and a light receiving unit. The light emitting unit emits light of a predetermined wavelength such as infrared light, and the light receiving unit detects light of the wavelength. While one sheet passes through a monitoring place of each of the optical sensors 1FS, emission light emitted from the light emitting unit is blocked in front of the light receiving unit or is reflected toward the light receiving unit by the sheet. In accordance with the blocking or the reflection, the output of the light receiving unit changes, and a sheet that is in the middle of passing through the monitoring position of each of the optical sensors 1FS, is detected.

The feed unit 10, the image generating unit 20, the fixing unit 30 and the sheet discharging unit 40 notifies the detection of a sheet using such optical sensors 1FS, . . . to the main control unit 60. In accordance with this notification, the main control unit 60 determines whether or not a jam (paper jam) has occurred, in other words, whether or not a delay of the conveyance timing of a sheet exceeds a threshold. In a case where a jam has occurred, an error process, for example, the stop of a process performed by the MFP 100 or a notification of a jam to a user through display of an operation panel 51 or the like is performed.

At start ends of conveyance paths positioned near the sheet feeding cassettes 11a and 11b, sheet feed sensors 1FS and 2FS are installed. In accordance with whether a delay is present or not in the passage timing of a sheet represented by such outputs, it is determined whether or not the sheet feeding roller groups 12P, 12F, and 12R feed each sheet in the path at normal timing.

In a path from the sheet feeding cassette 11b of a second stage, in addition to a vertical conveyance roller 13, a vertical conveyance sensor CS is installed in front of a place MP at which this path is merged with a path from the sheet feeding cassette 11a of a first stage. In accordance with whether or not a delay of the passage timing of a sheet represented by the output is a threshold or less, it is determined whether the vertical conveyance roller 13 sends out each sheet to the merging place MP at normal timing. This threshold is set in advance based on variations of a time required for the feed unit 10 to cause a sheet to arrive at a monitoring place of the vertical conveyance sensor CS from the sheet feeding cassette 11b of the second stage.

Near the boundary between the feed unit 10 and the image generating unit 20, on a further downstream side than the merging place MP of paths from the sheet feeding cassettes 11a and 11b and the input tray 16, a timing sensor TS is installed in addition to the timing roller 27. In accordance with whether or not a delay of the passage timing of a sheet represented by the output of the timing sensor TS is a threshold or less, it is determined whether or not the sheet arrives at the timing roller 27 at normal timing, and whether or not the sheet is sent out from the timing roller 27 at normal timing. This threshold is set in advance based on a variation of a time required for the feed unit 10 to cause a sheet to arrive at the monitoring place of the timing sensor TS from the sheet feeding cassette 11 or the like.

Between the fixing unit 30 and the sheet discharging opening 42, a sheet discharging sensor ES is installed. In accordance with whether or not a delay of the passage timing of a sheet represented by this output is a threshold value or less, it is determined whether the fixing roller 31 sends out the sheet at normal timing and whether or not the sheet is pulled by the sheet discharging roller 43 at normal timing. This threshold is set in advance based on a variation of a time required for the fixing unit 30 and the sheet discharging unit 40 to convey a sheet from the fixing unit 30 to the sheet discharging opening 42.

As further illustrated in FIG. 3, on the periphery of the conveyance path, drive motor groups M1 to M4, TM, MM, FM, and DM of the conveyance roller groups 12P, . . . are installed. Such motors M1, . . . , for example, are DC brushless (BLDC) motors and applies a rotation force to a drive target roller through a transmission system such as a gear, a belt, and the like. Near the sheet feeding cassettes 11a and 11b, the feed motors M1 and M2 rotate the pickup roller 12P, the sheet feeding roller 12F, and the separation roller 12R. Near the path from the sheet feeding cassette 11b of the second stage, the vertical conveyance motor M3 rotates the vertical conveyance roller 13. Near the path from the input tray 16, the feed motor M4 rotates the sheet feeding roller 15. Near a boundary between the feed unit 10 and the image generating unit 20, the timing motor TM rotates the timing roller 27. In the image generating unit 20, the main motor MM rotates the drive roller 23R of the intermediate transfer belt 23. In the fixing unit 30, the fixing motor FM rotates the fixing roller 31 and a pre-discharge roller 33. In the sheet discharging unit 40, a sheet discharging motor DM rotates the sheet discharging roller 43.

[Electronic Control System of Image Forming Apparatus]

Figure 4:
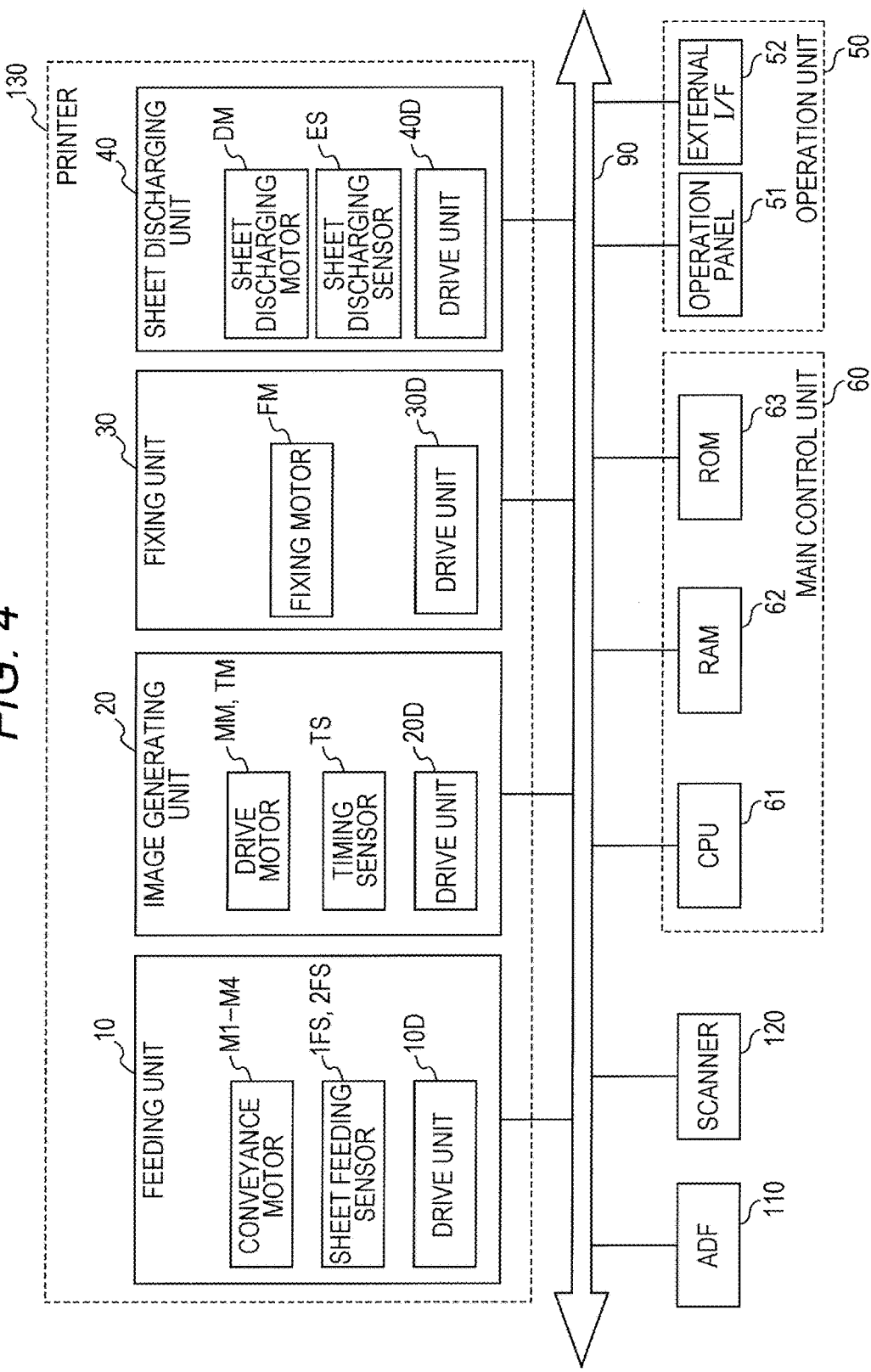
FIG. 4 is a block diagram that illustrates the configuration of an electronic control system of the image forming apparatus illustrated in FIG. 1.

FIG. 4 is a block diagram that illustrates the configuration of an electronic control system of the MFP 100. As illustrated in FIG. 4, in this control system, in addition to the ADF 110, the scanner 120, and the printer 130, an operation unit 50 and a main control unit 60 are communicably interconnected through a bus 90.

—Drive Unit of Printer—

Elements 10, 20, 30, and 40 of the printer 130 respectively include drive units 10D, 20D, 30D, and 40D. Each of the drive units 10D, . . . controls actuators of various movable members starting from the conveyance roller groups 12P, 12F, 12R, 23R, 27, 31, and 43. While not illustrated in FIG. 4, each of the drive units 10D, . . . , more specifically, in addition to the motors M1, . . . illustrated in FIG. 3, includes a control circuit and a drive circuit. The control circuit is an electronic circuit such as a microprocessor (MPU/CPU), an application specific integrated circuit (ASIC), or a programmable integrated circuit (FPGA), or the like. Based on the actual rotation number fed back from a motor, a drive circuit is instructed with a value of a voltage applied to the motor. The drive circuit is an inverter, and a voltage is applied to the motor by using a switching device such as a power transistor (FET). By using feedback control using the control circuit and the drive circuit, the drive units 10D, . . . , particularly, maintain the conveyance speed of a sheet according to the conveyance roller groups 12P, . . . to a target value that is given as an instruction from the main control unit 60.

The drive units 10D, . . . further monitor operation states of the elements 10 to 40 of the printer 130 and the conveyance state of a sheet by using various sensors and, in a case where a malfunction is detected from any one thereof, notifies the malfunction to the main control unit 60. Such sensors, in addition to the optical sensors 1FS, . . . illustrated in FIG. 3, include a positional sensor used for detecting the position or the posture of a movable member such as the photosensitive drums 25Y, . . . the fixing roller 31, or the like, a temperature sensor used for detecting overheating of a drive motor of such a movable member or a drive circuit thereof, a sensor used for out-of-paper in the sheet feeding cassettes 11a and 11b, a sensor used for detecting insufficiency of toner in the image generating units 21Y, . . . , and the like.

—Operation Unit—

The operation unit 50 receives a job request and image data that is a printing target through a user's operation or a communication with an external electronic apparatus and transmits the request and the image data to the main control unit 60. As illustrated in FIG. 4, the operation unit 50 includes an operation panel 51 and an external interface (I/F) 52. The operation panel 51, as illustrated in FIG. 1, includes a push button, a touch panel, and a display. The operation panel 51 displays GUI screens such as an operation screen and input screens for various parameters, and the like on the display. In addition, the operation panel 51 identifies a button pushed by a user or detects a position on the touch panel with which the user is brought into contact and transmits information relating to the identification or the detection to the main control unit 60 as operation information. Particularly, in a case where an input screen of a print job is displayed on the display, the operation panel 51 receives conditions relating to printing such as the size, a paper type, a posture (an identification between vertical orientation and horizontal orientation) of a printing target sheet, the number of prints, an identification between color/monochrome, image quality, and the like from a user and embeds items representing such conditions into the operation information. The external I/F 52 includes a USB port or a memory card slot and directly takes in image data that is a printing target from an externally attached storage device such as a USB memory or a hard disk drive (HDD). The I/F 52 is connected to an external network (not illustrated in FIG. 4) in a wired or wireless manner and receives image data that is a printing target from another electronic apparatus on the network.

—Main Control Unit—

The main control unit 60 is an integrated circuit mounted in one print circuit board installed inside the MFP 100. As illustrated in FIG. 4, the main control unit 60 includes a CPU 61, RAM 62, and ROM 63. The CPU 61 is configured by one MPU and executes various kinds of firmware, thereby realizing various functions as a control subject for the other elements 50, 110, 120, and 130. For example, the CPU 61 causes the operation unit 50 to display a GUI screen such as an operation screen and receive user's input operation. In accordance with this input operation, the CPU 61 determines the operation mode of the MFP 100 such as an operating mode, a standby (low power consumption) mode, or a sleep mode and instructs the elements 110, 120, and 130 to perform a process according to the operation mode. The CPU 61, particularly, selects a target value of a conveyance speed of a sheet according to the paper type or the paper thickness of a sheet represented by operation information supplied from the operation unit 50 and instructs the drive units 10D, . . . of the elements 10, . . . of the printer 130 for the target value. The RAM 62 is a volatile semiconductor memory device such as DRAM or SRAM and provides a work area used by the CPU 61 at the time of executing firmware for the CPU 61 and stores image data, which is a printing target, received by the operation unit 50. The ROM 63 is configured by a combination of a non-volatile memory device of a non-rewritable type and a nonvolatile storage device of a rewritable type. The former one stores firmware, and the latter includes a semiconductor memory device such as EEPROM, flash memory, or an SSD or an HDD and provides a storage area for an environment variable or the like for the CPU 61.

The main control unit 60 further monitors the operation states of the elements 110, . . . of the MFP 100 and, in a case where a malfunction is detected in any one thereof, appropriately changes the operation mode and resolves the malfunction. Particularly, in a case where a delay in the conveyance timing of a sheet is notified from each of the drive units 10D, 20D, . . . of the printer 130, in accordance with the notification, the main control unit 60 causes the printer 130 to stop the process and urges a user to resolve the malfunction by displaying a message indicating that "paper jam has occurred" on the operation panel 51. This is similarly applied to a case where overheating of the drive motors M1, . . . , of the conveyance roller, the drive circuits thereof, or the fixing roller 31, out-of-paper of the sheet feeding cassettes 11a and 11b, or insufficiency of toner in the image generating units 21Y, . . . is notified.

[Structure of Moving Amount Sensor]

For the timing roller 27 among the conveyance roller groups 12P, . . . illustrated in FIG. 3, high accuracy and high speed are particularly required in the rotation control thereof. In this rotation control, the timing and the speed at which the timing roller 27 passes a sheet to a nip between the intermediate transfer belt 23 and the secondary transfer roller 24 are matched to the timing and the speed at which a toner image formed on the intermediate transfer belt 23 passes the nip. As the accuracy of the matching becomes high, both the accuracy of a transfer position of the toner image on the sheet and the image quality of the toner image are high.

For the purpose of further improving the accuracy of the rotation control of the timing roller 27, as the timing sensor TS, the MET 100 uses an optical-type moving amount sensor according to the first embodiment of the present invention. Thus, the timing sensor TS detects the moving amount of a sheet sent out by the timing roller 27 with high accuracy at a high speed and feeds the detected moving amount to the drive unit 20D of the image generating unit 20 that is the control subject of the timing motor TM. Based on this moving amount, the position or the speed of the sheet is calculated with high accuracy in real time, and accordingly, the accuracy of the rotation control of the timing roller 27 is further improved.

Figure 5A:
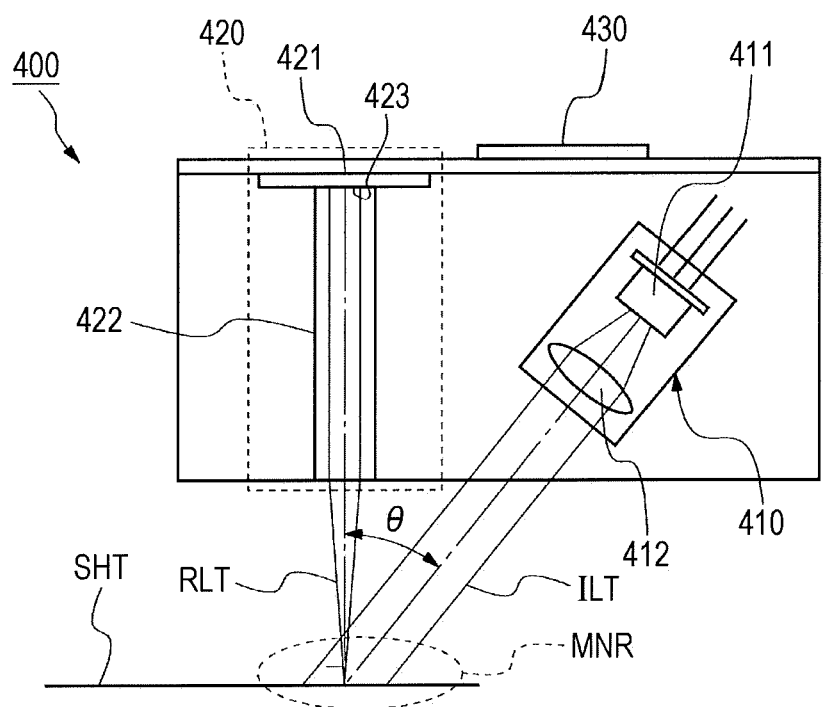
FIG. 5A is a schematic cross-sectional view that illustrates the structure of a timing sensor.

FIG. 5A is a schematic cross-sectional view that illustrates the structure of this moving amount sensor 400. As illustrated in FIG. 5A, this sensor 400 includes a light emitting unit 410, a light receiving unit 420, and a control unit 430.

The light emitting unit 410 includes a light source 411 and an emission optical system 412. The light source 411 is an LED or a semiconductor laser and, for example, is arranged at a distance of 5 to 10 mm from the conveyance path of a sheet traversing a monitoring region MNR. The emission optical system 412 emits light ILT of the light source to a sheet SHT from the diagonally front side. An incidence angle θ of the emission light ILT with respect to the sheet SHT, for example, set to 16° or less. In a case where the light source 411 is an LED, the emission optical system 412 is a condenser lens and converts the light of the LED into light ILT converging to the monitoring region MNR. On the other hand, in a case where the light source 411 is a semiconductor laser, the emission optical system 412 is a collimator lens and converts laser light into parallel light ILT that is toward the monitoring region MNR.

The light receiving unit 420 includes an imaging device 421 such as a CMOS or a CCD as an optical detector, converts light RLT of the light source 411 that is reflected by the surface of the sheet SHT in the normal-line direction into parallel light using a telecentric optical system 422, and causes the parallel light to be incident to the light receiving face 423 of the imaging device 421. This light receiving face 423 is arranged, for example, at a distance of 7 to 12 mm from the conveyance path of a sheet SHT traversing the monitoring region in parallel with the surface of the sheet SHT passing through the conveyance path. On the light receiving face 423, a matrix of pixels is formed in a square shape. The size of this matrix, for example, is 128 pixels×

128 pixels, and the size per one pixel, for example, is ⅟₈₀₀ inches≈32 μm. Each pixel, in accordance with the emission of the reflection light RLT, accumulates an electric charge amount that is in proportion to the light quantity. As a result, an electric charge distribution at the pixel pitch on the light receiving face 423 represents an optical quantity distribution of the reflection light RLT, in other words, an image of the monitoring region.

The control unit 430 is an electronic circuit such as an MPU/CPU, an ASIC, or an FPGA and is built in a single or a plurality of chips. The control unit 430 consecutively captures an image of the sheet SHT passing through the monitoring region at a constant sampling period, for example, at an interval of 1 ms by controlling the light source 411 and the imaging device 421. In addition, the control unit 430 compares a series of images captured by the imaging device 421, two images at each time and calculates a moving amount of the sheet SHT at the capture interval of the two images.

Figure 5B:
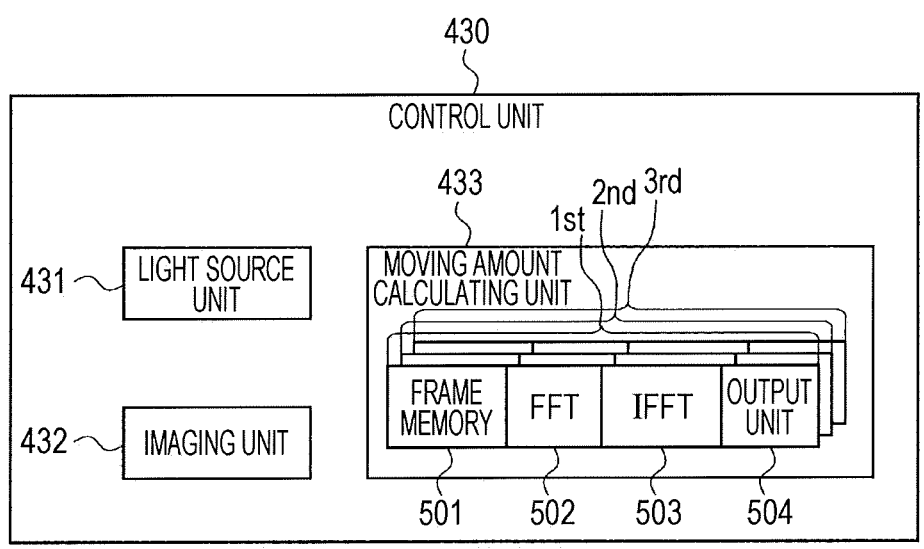
FIG. 5B is a functional block diagram of a control circuit device mounted in this sensor.

FIG. 5B is a functional block diagram of the control unit 430. As illustrated in FIG. 5B, the control unit 430 includes a light source unit 431, an imaging unit 432, and a moving amount calculating unit 433. The light source unit 431 is a control circuit for the light source 411 and maintains a quantity of light emitted from the light source 411 to a target value for a predetermined exposure time by adjusting the amount of a current supplied to the light source 411. The imaging unit 432 is a control circuit for the imaging device 421, takes in electric charge accumulated in each pixel of the imaging device 421 from the pixel, and generates data (hereinafter, referred to as a "frame") representing one image based on the amount of the current generated at that time. By repeating this operation at the sampling period, the imaging unit 432 outputs a series of frames, one frame per sampling period. The moving amount calculating unit 433 detects a change of the image with respect to time by comparing the series of frames, two frames at each time and calculates a moving amount of a subject based on the change.

As further illustrated in FIG. 5B, the moving amount calculating unit 433 includes a plurality of processing systems 1st, 2nd, 3rd, . . . . A total number of such processing systems 1st, . . . may be a ratio of a highest value to a lowest value that can be set as a target value of the conveyance speed of a sheet or more due to a reason to be described later. Any one of the processing systems 1st, . . . has a common configuration and includes a frame memory 501, a fast Fourier transform (FFT) unit 502, an inverse fast Fourier transform (IFFT) unit 503, and an output unit 504. The frame memory 501 is a volatile semiconductor memory device such as DRAM or SRAM and can store frames up to two frames. The FFT unit 502 performs an FFT for one frame read by the frame memory 501. The IFFT unit 503 acquires the product of two frames after the Fourier transform stored in the frame memory 501 and performs an IFFT for this product, thereby calculating a correlation coefficient between the two frames. The output unit 504, by using the IFFT unit 503, searches for a peak of the correlation coefficient between two frames stored in the frame memory 501, calculates the moving amount of a sheet from the position of the peak and, for example, outputs the moving amount to the drive unit 20D of the image generating unit 20.

[Operation Principle of Moving Amount Sensor]

Figure 6A:
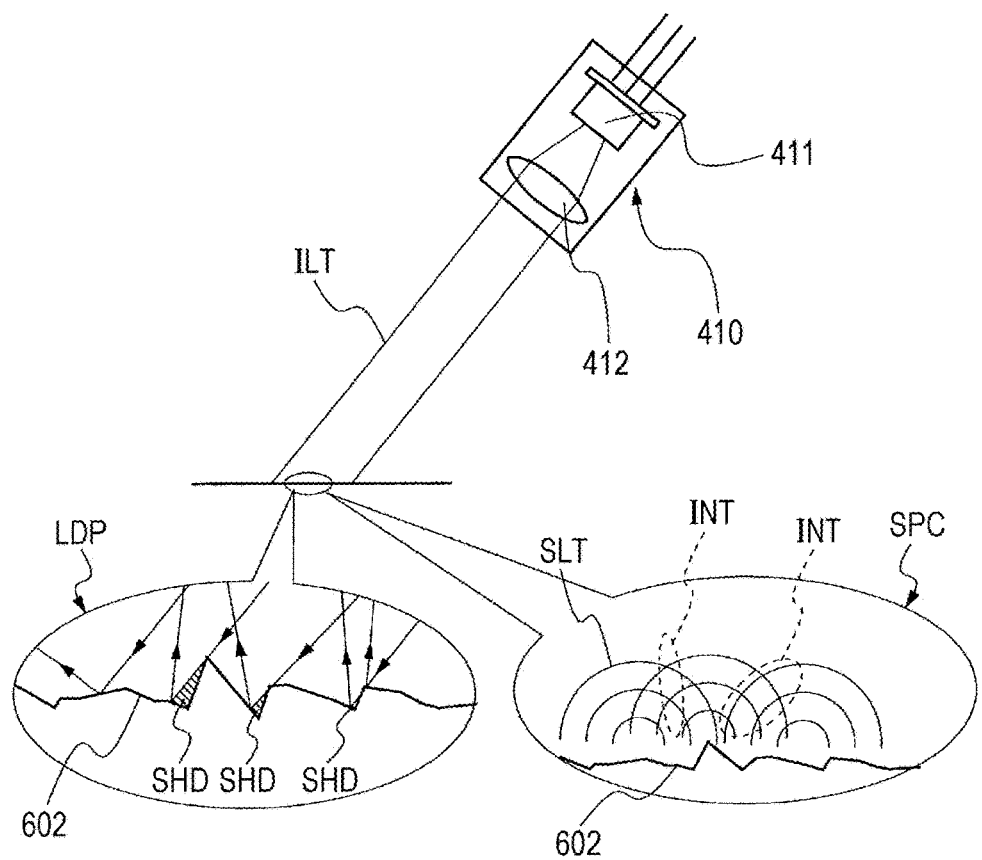
FIG. 6A is a schematic view illustrating an appearance that light transmitted from a light source illustrated in FIG. 5A is irregularly reflected by fine irregularities of an emission face.

The moving amount sensor 400 captures an image of shades or speckles appearing due to fine irregularities of the surface of a detection target. Accordingly, the moving amount sensor 400 measures the moving amount of the detection target with precision of a same degree as the typical scale of patterns of the shades or speckles, for example, precision of FIG. 6A is a schematic view illustrating an appearance that emission light ILT transmitted from the light emitting unit 410 is irregularly reflected by a fine irregularity 602 of an emission face 601. In a case where the emission face 601 is the surface of a sheet, the irregularity 602 is typically of a size of about μm due to shades of toner, ink, or the like attached to the surface thereof or undulations of the surface accompanying a disorderly arrangement of fibers configuring the sheet. Out of two enlarged views represented in FIG. 6A, one enlarged diagram LDP illustrates an appearance of a case where the light source 411 is an LED, and the other enlarged diagram SPC illustrates an appearance of a case where the light source 411 is a semiconductor laser.

In a case where the light source 411 is a visible-light LED, the wavelength 400 to 700 nm of the emission light ILT is sufficiently shorter than the size (about μm) of the irregularity 602. Accordingly, as illustrated in the enlarged diagram LDP, in the emission face 601, on the inner side of each concave portion and on the rear side of each convex portion, a portion at which the emission light ILT does not arrive, in other words, a shade SHD is generated depending on the diffraction.

In a case where the light source 411 is an infrared semiconductor laser, the wavelength 700 to 2000 nm of the emission light ILT is of a same degree as the size (about μm) of the irregularity 602. Accordingly, as illustrated in the enlarged diagram SPC, on the emission face 601, speckles are generated. Here, a "speckle" represents an interference occurring between scattered light when coherent light is scattered by unevenness having a size of a same degree as that of the wavelength. According to such an interference, reflection light having an intensity higher than that of the other area is emitted from an area INT in which scattered light SLT according to the irregularity 602 is mutually-intensified.

Figure 6B:
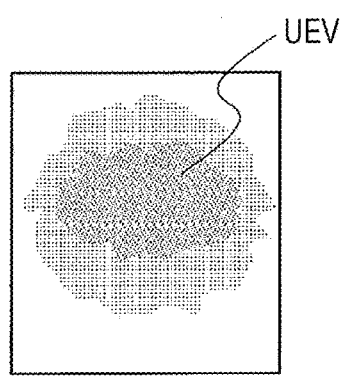
FIG. 6B is a schematic view that illustrates a brightness unevenness (speck), which appears in an image captured by an imaging device illustrated in FIG. 5A, caused by irregular reflection illustrated in FIG. 6A in a case where a light source is an LED.

FIG. 6B is a schematic view that illustrates a brightness "unevenness (speck)" UEV, which appears in an image captured by the imaging device 421, in a case where the light source 411 is an LED. Since all the depth of a concave potion, the height of a convex portion, and the position of an irregularity on the emission face 601 are irregularly distributed, the distribution of a shade SHD represented in the enlarged diagram LDP illustrated in FIG. 6A is irregular as well. As a result, in an image captured by the imaging device 421, as represented by a shade of dots in FIG. 6B, brightness unevenness UEV irregularly appears.

Figure 6C:
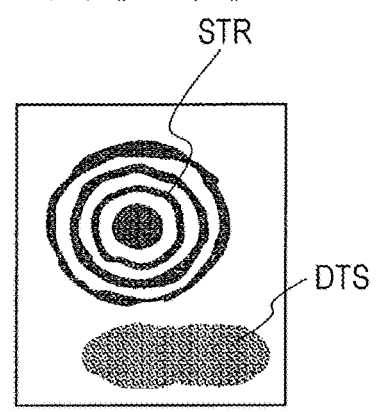
FIG. 6C is a schematic view that illustrates a speckle pattern, which appears in an image captured by the imaging device illustrated in FIG. 5A, caused by the irregular reflection illustrated in FIG. 6A in a case where a light source is a semiconductor laser.

FIG. 6C is a schematic view that illustrates a speckle pattern, which appears in an image captured by the imaging device 421, in a case where the light source 411 is a semiconductor laser. The "speckle pattern" is brightness unevenness appearing in an image due to speckles. The irregularity 602 formed on the emission face 601 is irregular, and the distribution of areas INT, in which the scattered light SLT illustrated in the enlarged diagram SPC in FIG. 6A is mutually-intensified, is also irregular. As a result, in the image captured by the imaging device 421, a speckle pattern such as a stripe pattern STR or a spot DTS illustrated in FIG. 6C irregularly appears.

Both the brightness unevenness UEV illustrated in FIG. 6B and the speckle pattern STR or DTS illustrated in FIG. 6C reflect the pattern of the irregularities 602 formed on the emission face 601 and thus are unique for each local portion of the emission face 601. Accordingly, reversely, a local portion of the emission face 601 can be identified based on the brightness unevenness UEV or the speckle patterns STR and DTS. Particularly, by detecting specific brightness unevenness UEV or specific speckle patterns STR and DTS in the image, a position at which a corresponding irregularity is located inside the image can be acquired.

Figure 7A:
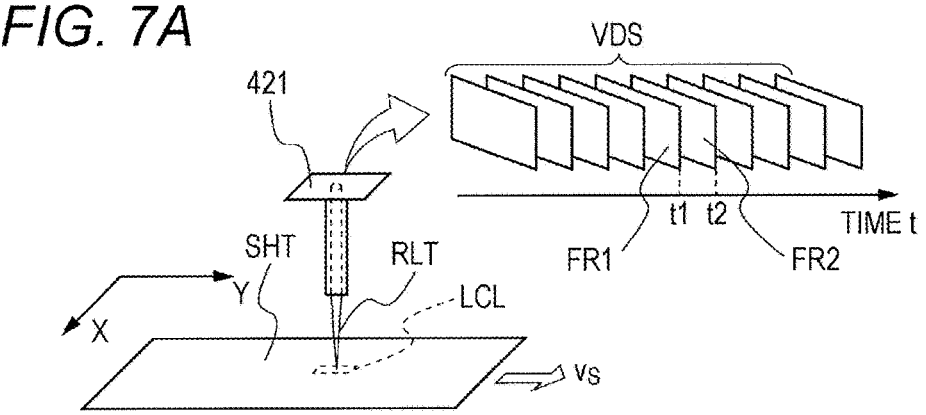
FIG. 7A is a schematic view that illustrates an image row captured by the imaging device illustrated in FIG. 5A at a sampling period.

FIG. 7A is a schematic view that illustrates an image row VDS captured by the imaging device 421 at a sampling period. As illustrated in FIG. 7A, this image row VDS illustrates a displacement of a surface portion LCL of a sheet SHT, which is in the middle of conveyance, passing through the monitoring region of the moving amount sensor 400 for each sampling period. In the image row VDS, the moving amount calculating unit 433 detects shades or patterns of speckles having a common characteristic and traces a displacement inside the image.

Figure 7B:
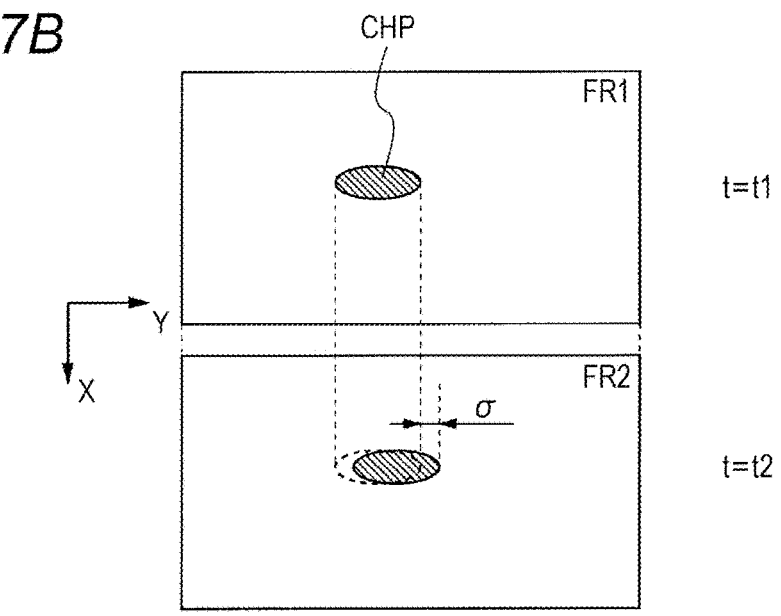
FIG. 7B is a schematic view that illustrates a displacement of a pattern having a common characteristic between two images in the image row.

FIG. 7B is a schematic view that illustrates a displacement of a pattern CHP having a common characteristic between consecutive two images FR1 and FR2 in this image row VDS. As illustrated in FIG. 7B, one FR1 of these two images illustrates a surface portion LCL of a sheet SHT at first time t=t1, and the other FR2 illustrates the surface portion LCL at second time t=t2 (>t1). Such a difference t2−t1 between the first time and the second time is the same as the sampling period (for example, 1 ms), and the sheet SHT moves in the conveyance direction (the Y-axis direction in FIGS. 7A to 7D) also during the short difference t2−t1. The moving amount calculating unit 433 detects portions CHP having a common characteristic by comparing the brightness distributions of these two images FR1 and FR2 with each other and acquires a displacement amount σ inside the images. The product of this displacement amount σ and the magnification of the telecentric optical system 422 illustrated in FIG. 5A is regarded as a moving amount of the sheet SHT between the first time t1 and the second time t2.

More specifically, the moving amount calculating unit 433 calculates a correlation coefficient between the brightness distributions of these two image FR1 and FR2 as a function of a distance s (generally, a vector) between pixels to be compared with each other, for example, by using the following Equation (1):

$$LM1*LM2(s)=F^{-1}[F[LM1(\bullet)]\times F[LM2(\bullet+s)]] \quad (1)$$

Here, the function LM1(•) represents a brightness distribution of the image at the first time t1, a function LM2(•) represents a brightness distribution of the image at the second time t2, and a transformation F[•] of such a function represents a Fourier transform, and an inverse transform $F^{-1}[\bullet]$ thereof represents an inverse Fourier transform.

Figure 7C:
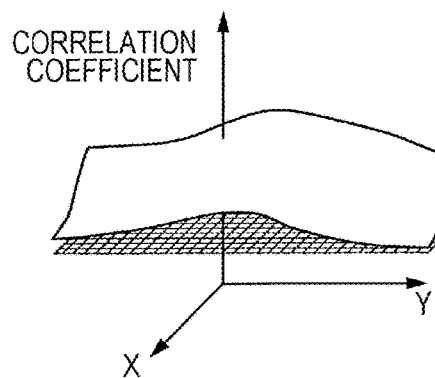
FIG. 7C is a graph that illustrates a distribution of correlation coefficients between the two images.
Figure 7D:
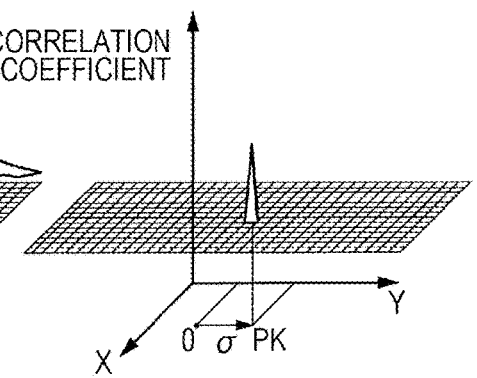
FIG. 7D is a graph that illustrates a distribution of a case where a background noise is eliminated from the distribution.

FIG. 7C is a graph that represents a distribution of correlation coefficients LM1*LM2(s) between the two images FR1 and FR2, and FIG. 7D is a graph that represents the distribution of a case where a background noise is eliminated from this distribution. As illustrated in FIGS. 7C and 7D, both the graphs are represented as histograms on a mesh of a pixel size. As illustrated in FIG. 7C, generally, the distribution of the correlation coefficient calculated using Equation (1) is represented as a smooth curved face having a large undulation over the whole image. Most of the modulations are caused by the distribution of the background noise and particularly represents a variation of the emission light ILT emitted from the light emitting unit 410. Accordingly, a speed at which the background noise changes is sufficiently lower than the conveyance speed of a sheet SHT. Accordingly, for example, the brightness distributions F[LM1(•)] and F[LM2(•)] of the images FR1 and FR2 after the Fourier transforms are processed using a high-pass filter before the calculation of Equation (1), and a low-frequency component is eliminated therefrom. In this way, as illustrated in FIG. 7D, most of gentle undulations of the curved face illustrated in FIG. 7C are eliminated, and a peak PK appears in the distribution of the correlation coefficient.

The position of this peak PK represents a displacement of the pattern of shades or speckles between the two images FR1 and FR2 accompanying the movement of the sheet. Actually, any one of the brightness distributions of the images FR1 and FR2 represents the pattern of the shades or the speckles due to the irregularity of the same sheet surface and thus, includes a common pattern caused by the same irregularity. A displacement represented by the common pattern between the two images FR1 and FR2 is due to the movement of the sheet SHT during a period from the first time t1 to the second time t2, and thus, a displacement amount (generally, a vector) is the same for any common pattern. Accordingly, a pixel positioned at arbitrary coordinates in the image FR1 at the first time t1 and a pixel that is separate from the same coordinates in the image FR2 at the second time t2 by the displacement amount of the common pattern represents the brightness of reflection light reflected from a same local portion of the sheet surface. Accordingly, a correlation between such pixels is particularly high. In this way, the peak PK of the correlation coefficient appears at a position deviating from the origin point s=0 by the common displacement amount.

The moving amount calculating unit 433 acquires the displacement amount σ of the peak PK from the origin point s=0 and calculates the product of the magnitude thereof and the magnification of the telecentric optical system 422 as the moving amount of the sheet SHT between the first time t1 and the second time t2.

[Parallel Process of Frame Using Moving Amount Sensor]

The moving amount sensor 400, as described above, calculates the moving amount of the sheet SHT based on the displacement amount σ of the peak PK of the correlation coefficient between two images FR1 and FR2. In a case where the moving amount calculating unit 433 detects this displacement amount σ at the pixel pitch, the lower limit of the detection is the same as the pixel size of the imaging device 421. Accordingly, for the detection of the moving amount of a sheet SHT, a time for an image of the surface portion LCL, more specifically, the distinctive pattern CHP of shades or speckles illustrated in FIG. 7B to move by at least the pixel size is necessary. Hereinafter, this time will be referred to as a "pixel traversing time".

The pixel traversing time, as will be described later, is in inverse proportional to the conveyance speed of a sheet. Meanwhile, the MFP 100 changes the conveyance speed in accordance with the paper type or the paper thickness of a sheet that is a conveyance target. Accordingly, the sampling period of an image sampled by the imaging device 421 is set to a pixel traversing time of a case where the conveyance speed is a reference value, for example, a maximum value that can be set. This value of the sampling period is maintained to be constant by the imaging unit 432 also in a case where the actual conveyance speed is lower than the maximum value. In such a case, since the pixel traversing time is longer than the sampling period, generally, the moving amount cannot be detected based on consecutive two images. Thus, the moving amount calculating unit 433, as will be described later, increases an imaging time difference between two images to be compared with each other in accordance with a decrease in the conveyance speed.

Figure 8A:
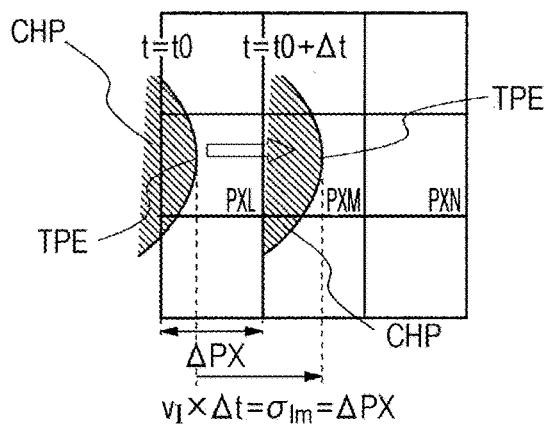
FIG. 8A is a schematic view that illustrates a relation between a minimum time required for detecting a displacement of a distinctive pattern of a shade or a speckle illustrated in FIG. 7B and a pixel size of the imaging device.

FIG. 8A is a schematic view that illustrates a relation between a pixel traversing time Δt and a pixel size ΔPX of the imaging device 421. As illustrated in FIG. 8A, a tip end TPE of a distinctive pattern CHP of shades or speckles is positioned at one pixel PXL at time t0. At this time, when a wide range of this pixel PXL is covered with the pattern CHP, a brightness difference between this pixel PXL and a pixel PXM adjacent to the pixel PXL on the downstream side (the positive direction of the Y axis in FIG. 8A) in the conveyance direction of a sheet increases. Meanwhile, at time t0+Δt, the tip end TPE of the pattern CHP is moved to the adjacent pixel PXM. At this time, when a wide range of this pixel PXM is covered with the pattern CHP, a brightness difference between this pixel PXM and a pixel PXN adjacent to the pixel PXM on the downstream side (the positive direction of the Y axis) in the conveyance direction increases. In this way, as the tip end TPE of the pattern CHP moves from one side of an adjacent pixel toward the other side by the pixel size ΔPX, a brightness difference between such pixels increases. In a case where the increase in the brightness difference is sufficient, for the first time, the displacement of the tip end TPE of the pattern CHP is detected. Accordingly, in a case where the tip end TPE is moved at a speed of $v_I$ above the light receiving face 432 of the imaging device 421, a detection lower limit $\sigma_{Im}$ of the displacement amount σ of the tip end TPE represented by the product of the speed $v_I$ and the pixel traversing time Δt is the same as the pixel size ΔPX: $v_I \times \Delta t = \sigma_{Im} = \Delta PX$. In a case where the telecentric optical system 422 represents a magnification of β, the conveyance speed $v_S$ is β times of the speed $v_I$. Accordingly, the product of the conveyance speed $v_S$ and the pixel traversing time Δt is the same as pixel size ΔPX×magnification β and is constant without depending on the conveyance speed $v_S$. In other words, the conveyance speed $v_S$ is in the inverse proportion to the pixel traversing time Δt.

Figure 8B:
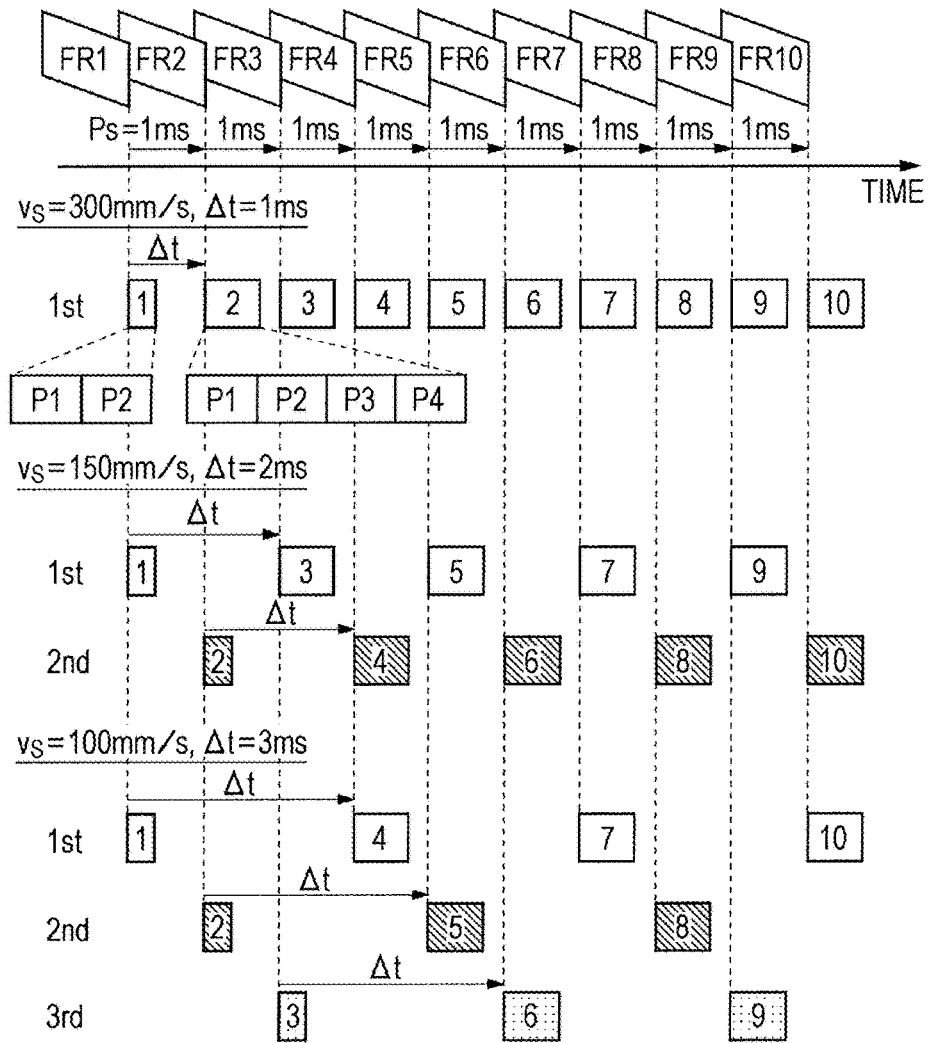
FIG. 8B is a schematic view that illustrates a parallel process performed by a moving amount calculating unit illustrated in FIG. 5B for a series of frames generated by the imaging unit illustrated in FIG. 5B.

FIG. 8B is a schematic view that illustrates a parallel process performed by the moving amount calculating unit 433 for a series of frames FR1, FR2, . . . generated by the imaging unit 432. As illustrated in FIG. 8B, the imaging unit 432 outputs the frames FR1, . . . one at each time per sampling period Ps. The moving amount calculating unit 433 performs the following four processes P1 to P4 for each of the frames FR1, . . . . In a first process P1, a frame is read from the imaging unit 432 into one of frame memories 501 of a plurality of processing systems 1st, 2nd, . . . . In a second process P2, an FFT is performed for each frame by the FFT unit 502. In addition, this process includes a step for removing a low frequency component corresponding to a background noise from each frame after the Fourier transform by using a high-pass filter. In a third process P3, a correlation coefficient between two frames is calculated by the IFFT unit 503. In a fourth process P4, a search for a peak PK of the correlation coefficient is performed by the output unit 504, and the product of a displacement amount σ from the origin point s=0 and the magnification β of the telecentric optical system 422 is calculated as one sample of the moving amount. Each rectangle illustrated in FIG. 8B represents the processing period of one frame completed by the four processes P1 to P4. However, the first rectangle of each rectangle row is an exception. These represent only the processing periods of two processing periods P1 and P2 of the first half among the four processes. In addition, numbers "1", "2", . . . represented inside the rectangles represent imaging sequences (hereinafter, referred to as "frame numbers") of an image in which a processing target frame appears.

As illustrated further in FIG. 8B, in a case where the target value of the conveyance speed $v_S$ of a sheet is set to be lower than a highest value, the moving amount calculating unit 433 divides the series of frames FR1, . . . into a plurality of frame rows, and different rows are performed in parallel by different processing systems. In the case illustrated in FIG. 8B, a process performed by the first processing system 1st is represented by a white rectangle, a process performed by the second processing system 2nd is represented by a rectangle covered with diagonal lines, and a process performed by the third processing system 3rd is represented by a rectangle covered with dots. The moving amount calculating unit 433 determines the number of frames to be divided from the series of frames FR1, . . . , in other words, the number of processing systems to be actually operated among built-in processing systems 1st, . . . to be a minimum value among integers equal to or larger than a ratio of the highest value to the target value of the conveyance speed $v_S$ of a sheet. In order to enable this determination, "the total number of the processing systems 1st, . . . may be preferably the ratio of the highest value to the lowest value that can be set as the target value or more".

Hereinafter, for further specific description, the following case will be assumed. First, the MFP 100 can switch the target value of the conveyance speed $v_S$ of a sheet to three steps of 300 mm/s, 150 mm/s, 100 mm/s. Second, the pixel size ΔPX of the imaging device 421 is 1/800 inches≈32 μm. Third, the magnification β of the telecentric optical system 422 is 10 times. Under such assumptions, the imaging unit 432 is designed: Ps=Δt=β×ΔPX/S≈10×32 μm/300 mm/s≈1 ms such that the sampling period Ps is fixed to a pixel traversing time Δt of a case where the target value of the conveyance speed $v_S$ is set to the highest value 300 mm/s. In addition, processing systems 1st, 2nd, and 3rd corresponding to a total number that is the same as the ratio of the highest value 300 mm/s to the lowest value 100 mm/s of the target value of the conveyance speed $v_S$ is mounted in the moving amount calculating unit 433.

In a case where the target value of the conveyance speed $v_S$ is actually set to the highest value 300 mm/s, the pixel traversing time Δt actually matches the sampling period Ps=1 ms: Δt=1 ms. In this case, there is a high possibility that a displacement of the pattern of shades or speckles is detected from any two frames FRn and FR (n+1) (here, n=1, 2, . . . ; similar in description presented below) among a series of frames FR1, . . . . Accordingly, the moving amount calculating unit 433 performs the processes P1 to P4 for each frame by operating only the first processing system 1st. Thus, in the third process P3 for each frame FR(n+1), the frame forms a pair with the previous frame FRn.

In a case where the target value of the conveyance speed $v_S$ is decreased to ½ times of the highest value 300 mm/s=150 mm/s, the pixel traversing time Δt increases to be twice the sampling period Ps=1 ms: Δt=2 ms. In this case, from a pair of each frame FRn and a frame FR(n+2) (here, n=1, 2, . . . ) representing an image after two frames in the imaging sequence, there is a high possibility that a displacement of the pattern of shades or speckles is detected. Accordingly, the moving amount calculating unit 433, first, acquires a ratio of the highest value 300 mm/s to the target value 150 mm/s of the conveyance speed $v_S$=300/150=2 and divides the series of frames FR1, . . . into two frame rows completed by frame groups having frame numbers each different by this ratio "2". In other words, the series of frames FR1, . . . are divided into a first frame rows FR1, FR3, . . . completed by frame groups of which the frame numbers are odd and a second frame row FR2, FR4, . . . completed by frame groups of even numbers. Next, the moving amount calculating unit 433 operates the first processing system 1st and the second processing system 2nd, delivers frames FR(2n−1) of which the frame numbers are odd to the first processing system 1st, and delivers frames FR2n of which the frame numbers are even to the second processing system 2nd. In this way, the first processing system 1st performs the processes P1 to P4 for the first frame row, and the second processing system 2nd performs the processes P1 to P4 for the second frame row. Particularly, in the third process P3 for each frame, the frame forms a pair with a previous frame belonging to the same row. In other words, in the first frame row, a (2n−1)-th frame FR(2n−1) and a (2n+1)-th frame FR (2n+1) form a pair, and, in the second frame row, a 2n-th frame FR2n and a (2n+2)-th frame FR(2n+2) form a pair.

In a case where the target value of the conveyance speed $v_S$ is decreased to ⅓ times of the highest value 300 mm/s=100 mm/s, the pixel traversing time Δt increases to be three times the sampling period Ps=1 ms: Δt=3 ms. In this case, from a pair of each frame FRn and a frame FR(n+3) (here, n=1, 2, . . . ) representing an image after three frames in the imaging sequence, there is a high possibility that a displacement of the pattern of shades or speckles is detected. Accordingly, the moving amount calculating unit 433, first, acquires a ratio of the highest value 300 mm/s to the target value 100 mm/s of the conveyance speed $v_S$=300/100=3 and divides the series of frames FR1, . . . into three frame rows completed by frame groups having frame numbers, each different by this ratio "3". In other words, the series of frames FR1, . . . are divided into a first frame row of FR1, FR4, . . . , completed by frame groups having the same remainder (hereinafter, referred to as "frame numbers are the same as "3" modulo "1") of "1" in case of dividing the frame number by "3", a second frame row of FR2, FR5, . . . , completed by frame groups having the same remainder of "2" in the case, and a third frame row of FR3, FR6, . . . , completed by frame groups having the same remainder of "0" in the case. Next, the moving amount calculating unit 433 operates all the three processing systems 1st to 3rd, delivers frames FR (3n−2) of which the frame numbers are the same as "3" modulo "1 " to the first processing system 1st, delivers frames FR(3n−1) of which the frame numbers are the same as "3" modulo "2" to the second processing system 2nd, and delivers frames FR3n of which the frame numbers are the same as "3" modulo "0" to the third processing system 3rd. In this way, the processes P1 to P4 for the first frame row performed by the first processing system 1st, the processes P1 to P4 for the second frame row performed by the second processing system 2nd, and the processes P1 to P4 for the third frame row performed by the third processing system 3rd are performed in a parallel manner. Particularly, in the third process P3 for each frame, the frame forms a pair with a previous frame belonging to the same row. In other words, in the first frame row, a (3n−2)-th frame FR(3n−1) and a (3n+1)-th frame FR(3n+1) form a pair, in the second frame row, a (3n−1)-th frame FR (3n−1) and a (3n+2)-th frame FR (3n+2) form a pair, and, in the third frame row, a (3n)-th frame FR3n and a (3n+3)-th frame FR(3n+3) form a pair.

As described above, the moving amount calculating unit 433 increases the number of processing systems that are simultaneously operated in accordance with a decrease in the conveyance speed $v_S$ of a sheet. More specifically, the moving amount calculating unit 433 sets the number to a ratio $v_{MAX}/v_T$ of the highest value $v_{MAX}$ to the target value $v_T$ of the conveyance speed $v_S$. This ratio $v_{MAX}/v_T$ is the same as the ratio Δt/Ps of the pixel traversing time Δt to the sampling period Ps based on an inversely proportional relation between the conveyance speed $v_S$ and the pixel traversing time Δt: $v_{MAX}/v_T$=Δt/Ps. Since one frame is generated per the sampling period Ps, this ratio Δt/Ps is the same as a difference Dif of the imaging sequence between two images having a sufficiently high possibility of detecting a displacement of the pattern of shades or speckles. In other words, when the imaging sequence is increased up to this difference Dif, the imaging time difference increases up to the pixel traversing time Δt. Accordingly, there is a sufficiently high possibility of detecting a displacement of the pattern of shades or speckles. Accordingly, when processing systems corresponding to the same number as the difference Dif are simultaneously operated, the series of frames FR1, . . . can be processed, two frames of which the frame numbers are different by this difference Dif at each time per the sampling period Ps.

In this way, the moving amount calculating unit 433 calculates one sample of the moving amount of a sheet per the sampling period regardless of a decrease in the conveyance speed $v_S$ of the sheet. Particularly, there is a high possibility that any sample represents a value that is "significantly different from 0" (in other words, as a result of a statistical consideration of a noise, a measurement error, and the like, non "0" can be regarded not by accident) as the moving amount of the sheet. Accordingly, a response of feedback control of the conveyance roller group based on such a sample can be maintained at a high speed regardless of the conveyance speed of the sheet.

[Flow of Moving Amount Detecting Process]

Figure 9A:
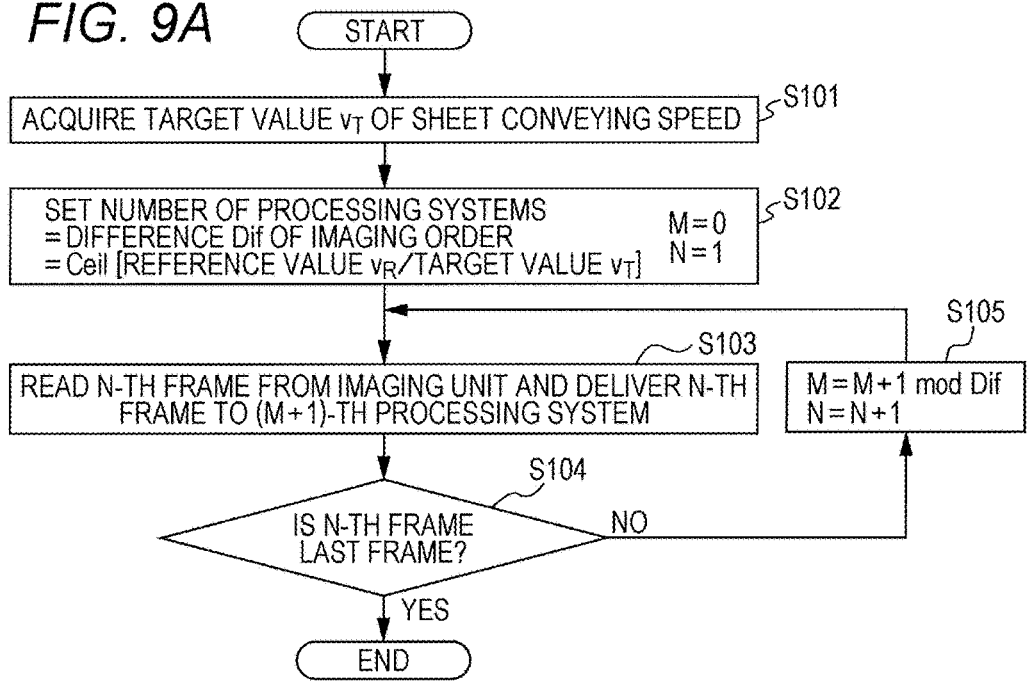
FIG. 9A is a flowchart of a process in which the moving amount calculating unit distributes a series of frames to processing systems in accordance with a conveyance speed of a sheet among parallel processes illustrated in FIG. 8B.

FIG. 9A is a flowchart of a process in which the moving amount calculating unit 433 distributes a series of frames to processing systems in accordance with a conveyance speed of a sheet among the parallel processes illustrated in FIG. 8B. For example, in a case where the moving amount sensor 400 is used as the timing sensor TS, this process is started when the control unit 430 is directed to monitor a sheet that is in the middle of conveyance from the drive unit 20D of the image generating unit 20.

In Step S101, the moving amount calculating unit 433 acquires a target value $v_T$ of the conveyance speed $v_S$ of a sheet from the drive unit 20D of the image generating unit 20. Thereafter, the process proceeds to Step S102.

In Step S102, the moving amount calculating unit 433, first, acquires a minimum value Dif among integers that are the ratio $v_{MAX}/v_T$ of the highest value $v_{MAX}$ to the target value $v_T$ of the conveyance speed $v_S$ of a sheet or more: Dif=Ceil[$v_{MAX}/v_T$]. Here, the operation symbol Ceil[•] represents a ceiling function. This value Dif is the same as a difference between imaging sequences of two images having a sufficiently high possibility of detecting a displacement of the pattern of shades or speckles. The moving amount calculating unit 433 acquires this value Dif through calculation or reads this value Dif stored in advance from a storage unit that is built in the control unit 430. Next, the moving amount calculating unit 433 operates processing systems corresponding to the same number as the difference Dif among the built-in processing systems 1st, . . . . The moving amount calculating unit 433 initializes one M of two kinds of integer-value variables to "0" and initializes the other N to "1": M=0 and N=1. Thereafter, the process proceeds to Step S103.

In Step S103, the moving amount calculating unit 433 reads a frame (hereinafter, referred to as an "N-th frame") of which the frame number is the same as the value of the variable N from the imaging unit 432 and delivers this frame to an (M+1)-th processing system that is one of Dif processing systems operated in Step S102. Thereafter, the process proceeds to Step S104.

In Step S104, the moving amount calculating unit 433 checks whether or not the N-th frame is the last frame by using the imaging unit 432. In the case of the last frame, the process ends. On the other hand, in the case of not the last frame, the process proceeds to Step S105.

In Step S105, in the imaging unit 432, a frame of which the frame number is larger than that of the N-th frame remains. Accordingly, the moving amount calculating unit 433, first, increases the value of the variable N by "1": N=N+1. Next, the moving amount calculating unit 433 increases the value of the variable M by "1" as modulo of the imaging sequence difference DIF: M=M+1 mod Dif. In other words, the moving amount calculating unit 433 adds "1" to the value of the variable M and, when the sum arrives at the imaging sequence difference DIF, returns the variable M to "0". Thereafter, the process is repeated starting from Step S103.

According to the process illustrated in FIG. 9A, a series of frames generated by the imaging unit 432 are divided into Dif frame rows, and each row is delivered to a different processing system. Each of all the processing systems performs the processes P1 to P4 for the delivered frame.

Figure 9B:
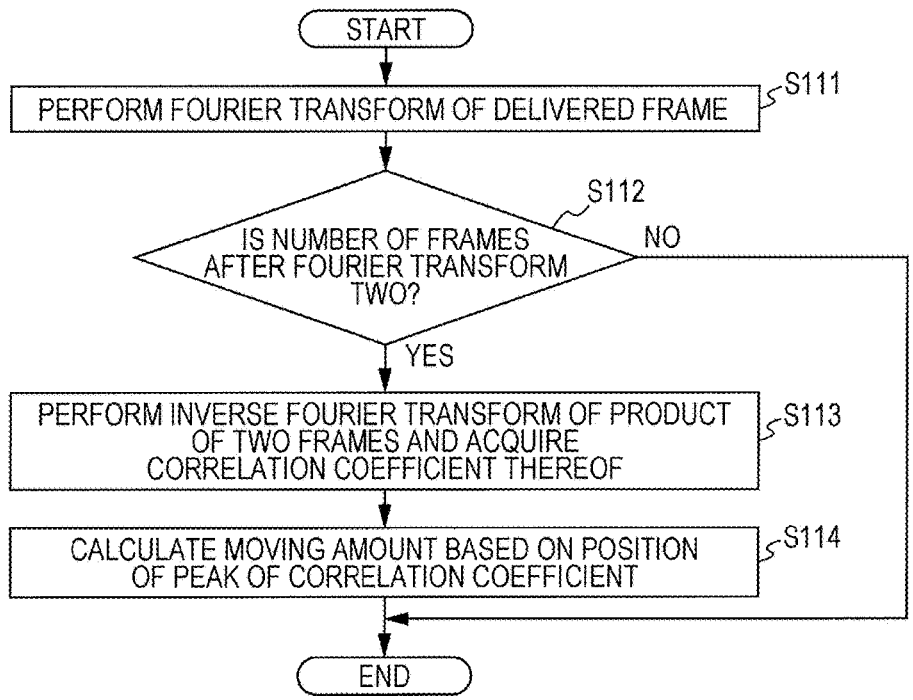
FIG. 9B is a flowchart of a process performed by each processing system for a frame.

FIG. 9B is a flowchart of the series of processes P1 to P4 performed by each processing system for a frame. This series of processes are started when one frame is delivered from the imaging unit 432 to the processing system.

In Step S111, the processing system, first, stores the frame delivered from the imaging unit 432 in Step S104 in the frame memory 501 (P1) and performs an FFT for the frame by using the FFT unit 502 (P2). Thereafter, the process proceeds to Step S112.

In Step S112, the processing system checks whether or not the number of frames after the Fourier transform that are in a state stored in the frame memory 501 is two. In a case where the number of frames is two, the process proceeds to Step S113. On the other hand, the number of frames is one or less, the process ends.

In Step S113, in the frame memory 501, a state is formed in which two frames after the Fourier transform are stored. Thus, the processing system acquires the product thereof from the two frames and performs an IFFT for the product by using the IFFT unit 503. Accordingly, a correlation coefficient between the two frames is calculated (P3). Thereafter, the process proceeds to Step S114.

In Step S114, the processing system, by using the output unit 504, searches for a position at which the correlation coefficient calculated in Step S113 represents a peak and calculates a moving amount of a sheet from the position. This moving amount is transmitted to the drive unit 20D of the image generating unit 20 as one sample. Thereafter, the process ends.

[Advantage of First Embodiment]

The MFP 100 according to the first embodiment of the present invention uses the moving amount sensor 400 as the timing sensor TS. This moving amount sensor 400, as described above, repeatedly captures images of the surface of a sheet while the sheet is moved. At this time, the moving amount sensor 400 fixes the imaging interval, in other words, the sampling period Ps to a value of a case where the target value $v_T$ is the highest value $v_{MAX}$ also in a case where the target value $v_T$ of the conveyance speed of the sheet is lower than the highest value $v_{MAX}$. Meanwhile, the moving amount sensor 400 divides a series of images (more specifically, a series of frames FR1, . . . ) that have been captured into image rows corresponding to a number according to the ratio of the highest value $v_{MAX}$ to the target value $v_T$ of the conveyance speed and calculates the moving amount of the sheet based on a difference (more specifically, a peak displacement of the correlation coefficient of the brightness distribution) between consecutive two images in each image row. Between these two images, the imaging sequence is different by the ratio, and accordingly, the imaging time difference is the same as the pixel traversing time. Thus, from the difference between these two images, there is a sufficiently high possibility that the moving amount of the sheet is detected as a value significantly different from "0". In this way, also in a case where the conveyance speed of a sheet is decreased, the moving amount sensor 400 can calculate one sample at the sampling period Ps having a significant moving amount of the sheet. As a result, regardless of a decrease in the conveyance speed of a sheet, a time required for receiving feedback of significant samples corresponding to a constant number is not changed, and accordingly, the MFP 100 can maintain the response of the feedback control of the timing roller 27 at a high speed.

[Modified Example]

(A) The image forming apparatus illustrated in FIG. 1 is the MFP 100. The image forming apparatus according to the first embodiment of the present invention may be any single body such as a laser printer, an ink jet printer, a facsimile, or a copy machine other than the MFP.

(B) The MFP 100 uses the moving amount sensor 400 as the timing sensor TS. This moving amount sensor 400 may be used for the conveyance control of a sheet as the other optical sensors 1FS, . . . . In addition, the moving amount detection target is not limited to the sheet but may be an image carrying rotary body such as the photosensitive drums 25Y, . . . , or the intermediate transfer belt 23. Such a moving amount may be used for rotation control of the image carrying rotary body or image stabilization control.

(C) The moving amount calculating unit 433 determines the number of frame rows to be divided from the series of frames FR1, . . . , in other words, the number of processing systems to be actually operated among the built-in processing systems 1st, . . . to be a minimum value Dif=Ceil[$v_{MAX}/v_T$] among integers that are the ratio of the highest value $v_{MAX}$ to the target value $v_T$ of the conveyance speed $v_S$ of a sheet or more. Here, the target value $v_T$ of the conveyance speed $v_S$, different from the example illustrated in FIG. 8B, may not be "1/the integer part of the highest value $v_{MAX}$". More specifically, in a case where the target value $v_T$ is set in a range that is less than the highest value $v_{MAX}$ (for example, 300 mm/s) and ½ times thereof (for example, 150 mm/s) or more, the value Dif is determined as "2". On the other hand, in a case where the target value $v_T$ is set in a range that is less than ½ time the highest value $v_{MAX}$ (for example, 150 mm/s) and ⅓ times thereof (for example, 100 mm/s) or more, the value Dif is determined as "3". The target value $v_T$ of the conveyance speed $v_S$ and the value Dif associated therewith in this way may be acquired by the moving amount calculating unit 433 for each process through calculation or may be searched from a table that is stored in advance in a storage unit built in the control unit 430.

(D) The sampling period Ps is set to the pixel traversing time of a case where the conveyance speed $v_S$ of a sheet is the highest value $v_{MAX}$. Alternatively, the sampling period Ps may be set to a pixel traversing time of a case where the conveyance speed $v_S$ is a reference value $v_R$ ($<v_{MAX}$) lower than the highest value $v_{MAX}$. In such a case, in the definition equation of the value Dif, the highest value $v_{MAX}$ may be substituted by the reference value $v_R$: Dif=Ceil[$v_R/v_T$]. In a case where the target value $v_T$ of the conveyance speed $v_S$ is set to be the reference value $v_R$ or more, the value Dif may be commonly fixed to "1".

(E) In the case illustrated in FIG. 8B, as represented by each rectangle, a time required for the series of processes P1 to P4 for one frame is shorter than the sampling period Ps. Alternatively, this time may be longer than the sampling period Ps. In such a case, each of the processing systems 1st, . . . may perform consecutive frames in a parallel manner by forming four processes P1, . . . , P4 as pipelines. For example, it may be configured such that an FFT is performed for a second frame (P2), and a third frame is read into the frame memory 501 (P1). In addition, it may be configured such that a correlation coefficient with the first frame is acquired by performing an IFFT for the second frame (P3), an FFT is performed for the third frame (P2), and a fourth frame is read into the frame memory 501 at the same time (P1).

(F) The moving amount calculating unit 433 feeds back one sample of the moving amount per the sampling period to the drive unit 20D of the image generating unit 20 and the like. Alternatively, the moving amount calculating unit 433 may accumulate a predetermined number of samples, acquire an average value thereof, and feed back the average value to the drive unit 20D of the image generating unit 20 and the like as one sample. In such a case, a deviation (standard deviation) of samples that are actually fed back to the image generating unit 20 and the like are suppressed by a reciprocal of the square root of the number of accumulated samples.

(G) The moving amount calculating unit 433 calculates a correlation coefficient between brightness distributions of two images by using Equation (1) and calculates the moving amount of the sheet based on the displacement amount of the peak thereof. Separately from that, by using another image recognition technology such as a combination of edge detection, a histogram (HOG) in the gradient direction of brightness, and a support vector machine (SVM) or the like, the moving amount calculating unit 433 may search for a portion CHP (see FIG. 7B) having a common characteristic of the pattern of shades or speckles between two images and calculate the moving amount of the sheet based on a displacement amount σ of the portion CHP inside the images.

(H) The moving amount calculating unit 433, as illustrated in FIG. 5B, mounts a plurality of processing systems 1st, 2nd, 3rd, . . . , distributes a series of frames to some of the processing systems, and processes the frames in a parallel manner. Alternatively, the parallel process illustrated in FIG. 8B may be realized by embedding a storage unit in the control unit 430 and causing the storage unit to be used by the processing systems as will be described later in place of narrowing down the processing systems mounted in the moving amount calculating unit 433 into one.

Figure 10:
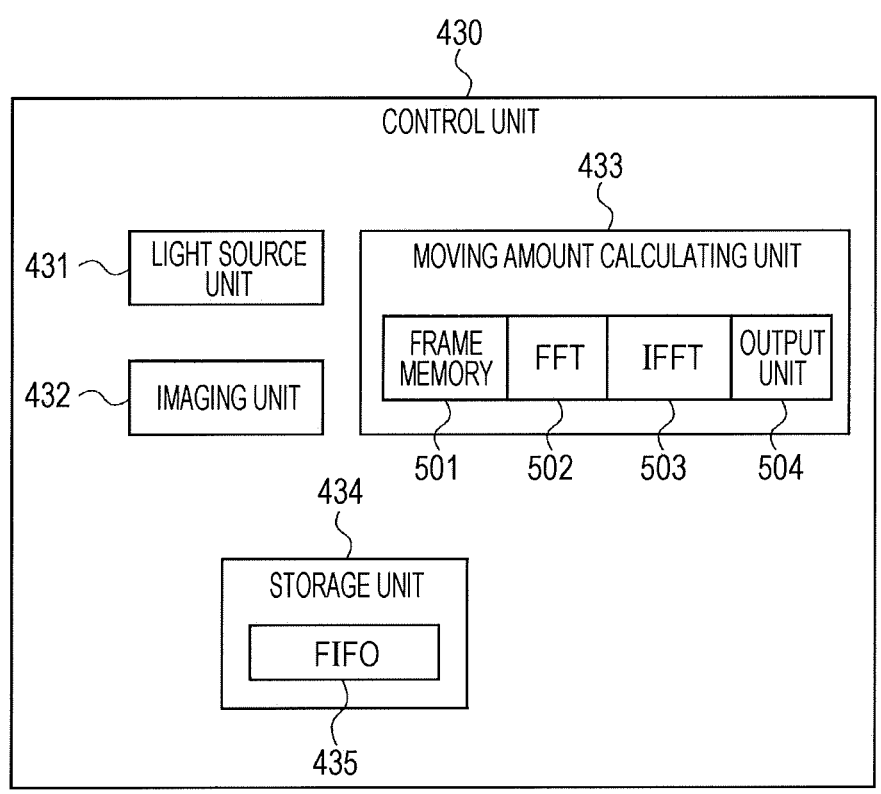
FIG. 10 is a functional block diagram of a control unit according to a modified example.

FIG. 10 is a functional block diagram of a control unit 430 according to this modified example. As illustrated in FIG. 10, a moving amount calculating unit 433 includes only one processing system 501 to 504. On the other hand, the control unit 430 further includes a storage unit 434. The storage unit 434 is a volatile semiconductor memory device such as DRAM or a SRAM and includes a first-in first-out (FIFO) area 435. The storage unit 434 performs input/output of frames generated by the imaging unit 432 for this area 435 by using a FIFO system.

The moving amount calculating unit 433, in the parallel process for the series of frames FR1, . . . illustrated in FIG. 8B, causes the storage unit 434 to secure the FIFO area, and this FIFO area and two areas each having one frame size included in the frame memory 501 are used as below.

FIGS. 11A, 11B, and 11C are schematic views that illustrate the appearances that the moving amount calculating unit 433 moves processing target frames FR1, . . . between the frame memory 501 and the storage unit 434 in the parallel process illustrated in FIG. 8B in a case where target values of the conveyance speed $v_S$ of a sheet are 300 mm/s, 150 mm/s, and 100 mm/s. As illustrated in FIG. 11A, in a case where the target value of the conveyance speed $v_S$ is a highest value 300 mm/s, the moving amount calculating unit 433 uses only the frame memory 501. On the other hand, as illustrated in FIGS. 11B and 11C, in a case where the target value of the conveyance speed $v_S$ is lower than the highest value 300 mm/s, the moving amount calculating unit 433 uses the FIFO area of the storage unit 434 in addition to two areas 901 and 902 (hereinafter, respectively referred to as a "first area" and a "second area") included in the frame memory 501.

—Target Value of Conveyance Speed $v_S$=Highest Value 300 mm/s—

As illustrated in FIG. 8B, the pixel traversing time Δt is the same (Δt=1 ms) as the sampling period Ps, and, in the third process P3 for each frame FR(n+1), the frame may be configured as a pair with the previous frame FRn. Accordingly, the moving amount calculating unit 433 performs the processes P1 to P4 for each frame without securing the FIFO area in the storage unit 434. As illustrated in FIG. 11A, this processing period may be divided into a plurality of periods T1, T2, T3, . . . by using time points at which one frame is read from the imaging unit 432 as boundaries.

In this first period T1, the moving amount calculating unit 433 reads the first frame FR1 into the first area 901 from the imaging unit 432 (P1) and performs an FFT for this frame FR1 (P2).

In the second period T2, the moving amount calculating unit 433 moves the first frame FR1 after the Fourier transform from the first area 901 to the second area 902, reads the second frame FR2 into the first area 901 from the imaging unit 432 (P1), and performs an FFT for this frame FR2 (P2). Subsequently, from two frames FR1 and FR2 after the Fourier transform stored in the first area 901 and the second area 902, the moving amount calculating unit 433 acquires the product thereof and calculates the correlation coefficient by performing an IFFT for the product (P3). The moving amount calculating unit 433 further calculates the sample SM1 of the moving amount from the peak of the correlation coefficient and outputs the sample (P4).

In the third period T3, the moving amount calculating unit 433 moves the second frame FR2 after the Fourier transform from the first area 901 to the second area 902, reads the third frame FR3 into the first area 901 from the imaging unit 432 (P1), and performs an FFT for this frame FR3 (P2). Subsequently, the moving amount calculating unit 433 acquires, from two frames FR2 and FR3 after the Fourier transform stored in the first area 901 and the second area 902, the product thereof and calculates a correlation coefficient by performing an IFFT for the product thereof (P3). The moving amount calculating unit 433 further calculates a sample SM2 of the moving amount from the peak of the correlation coefficient and outputs the sample SM2 (P4).

Thereafter, the moving amount calculating unit 433 repeats a process similar to those of the second period T2 and the third period T3. In this way, one sample is calculated for every consecutive two frames FRn and FR(n+1).

—Target Value of Conveyance Speed $v_S$=½ Times Highest Value, 150 mm/s—

As illustrated in FIG. 8B, the pixel traversing time Δt is the same (Δt=2 ms) as twice the sampling period Ps, and, in the third process P3 for each of frames FR(2n−1) and FR2n, the frame may be configured as a pair with a frame FR(2n+1) or FR(2n+2) that is two frames after the frame in the imaging sequence. In such a case, the moving amount calculating unit 433 secures the FIFO area 911 that can store one frame in the storage unit 434 and then performs the processes P1 to P4 for each frame. As illustrated in FIG. 11B, this processing period may be divided into a plurality of periods T1, T2, T3, . . . by using time points at which one frame is read from the imaging unit 432 as boundaries.

In this first period T1, the moving amount calculating unit 433 reads the first frame FR1 into the first area 901 from the imaging unit 432 (P1) and performs an FFT for this frame FR1 (P2).

In the second period T2, the moving amount calculating unit 433 stores the first frame FR1 after the Fourier transform in the FIFO area 911 from the first area 901, reads the second frame FR2 into the first area 901 from the imaging unit 432 (P1), and performs an FFT for this frame FR2 (P2).

In the third period T3, the moving amount calculating unit 433 reads the first frame FR1 into the second area 902 from the FIFO area 911 and stores the second frame FR2 after the Fourier transform in the FIFO area 911 from the first area 901. Subsequently, the moving amount calculating unit 433 reads the third frame FR3 into the first area 901 from the imaging unit 432 (P1) and performs an FFT for this frame FR3 (P3). Thereafter, the moving amount calculating unit 433 acquired, from two frames FR1 and FR3 after the Fourier transform stored in the second area 902 and the first area 901, the product thereof and calculates a correlation coefficient by performing an IFFT for the product thereof (P3). The moving amount calculating unit 433 further calculates a sample SM1 of the moving amount from the peak of the correlation coefficient and outputs the sample SM1 (P4).

In the fourth period T4, the moving amount calculating unit 433 reads the second frame FR2 into the second area 902 from the FIFO area 911 and stores the third frame FR3 after the Fourier transform in the FIFO area 911 from the first area 901. Subsequently, the moving amount calculating unit 433 reads the fourth frame FR4 into the first area 901 from the imaging unit 432 (P1) and performs an FFT for this frame FR4 (P2). Thereafter, the moving amount calculating unit 433 acquires, from two frames FR2 and FR4 after the Fourier transform stored in the second area 902 and the first area 901, the product thereof and calculates a correlation coefficient by performing an IFFT for the product thereof (P3). The moving amount calculating unit 433 further calculates a sample SM2 of the moving amount from the peak of the correlation coefficient and outputs the sample SM2 (P4).

Thereafter, the moving amount calculating unit 433 repeats a process similar to those of the third period T3 and the fourth period T4. In this way, one sample is calculated for every consecutive three frames FR(2n−1), FR2n, and FR(2n+1).

—Target Value of Conveyance Speed $v_S$=⅓ Times Highest Value, 100 mm/s—

As illustrated in FIG. 8B, the pixel traversing time Δt is the same (Δt=3 ms) as three times the sampling period Ps, and, in the third process P3 for each of frames FR(3n−2), FR(3n−1), and FR3n, the frame may be configured as a pair with a frame FR(3n+1), FR(3n+2), or FR(3n+3) that is three frames after the frame in the imaging sequence. In such a case, the moving amount calculating unit 433 secures the FIFO areas 911, 912 that can store up to two frames in the storage unit 434 and then performs the processes P1 to P4 for each frame. As illustrated in FIG. 11C, this processing period may be divided into a plurality of periods T1, T2, T3, . . . by using time points at which one frame is read from the imaging unit 432 as boundaries.

In this first period T1, the moving amount calculating unit 433 reads the first frame FR1 into the first area 901 from the imaging unit 432 (P1) and performs an FFT for this frame FR1 (P2).

In the second period T2, the moving amount calculating unit 433 stores the first frame FR1 after the Fourier transform in a first stage 911 of the FIFO area from the first area 901, reads the second frame FR2 into the first area 901 from the imaging unit 432 (P1), and performs an FFT for this frame FR2 (P2).

In the third period T3, the moving amount calculating unit 433 stores the second frame FR2 after the Fourier transform in the first stage 911 of the FIFO area from the first area 901. In accordance with this, the storage unit 434 moves the first frame FR1 from the first stage 911 of the FIFO area to the second stage 922. Subsequently, the moving amount calculating unit 433 reads the third frame FR3 into the first area 901 from the imaging unit 432 (P1) and performs an FFT for this frame FR3 (P2).

In the fourth period T4, the moving amount calculating unit 433 reads the first frame FR1 into the second area 902 from the second stage 912 of the FIFO area and stores the third frame FR3 after the Fourier transform in the first stage 911 of the FIFO area from the first area 901. In accordance therewith, the storage unit 434 moves the second frame FR2 from the first stage 911 of the FIFO area to the second stage 922. Meanwhile, the moving amount calculating unit 433 reads the fourth frame FR4 into the first area 901 from the imaging unit 432 (P1) and performs an FFT for this frame FR4 (P2). Subsequently, the moving amount calculating unit 433 acquired, from two frames FR1 and FR4 after the Fourier transform stored in the second area 902 and the first area 901, the product thereof and calculates a correlation coefficient by performing an IFFT for the product thereof (P3). The moving amount calculating unit 433 further calculates a sample SM1 of the moving amount from the peak of the correlation coefficient and outputs the sample SM1 (P4).

In the fifth period T5, the moving amount calculating unit 433 reads the second frame FR2 into the second area 902 from the second stage 912 of the FIFO area and stores the fourth frame FR4 after the Fourier transform in the first stage 911 of the FIFO area from the first area 901. In accordance therewith, the storage unit 434 moves the third frame FR3 from the first stage 911 of the FIFO area to the second stage 922. Meanwhile, the moving amount calculating unit 433 reads the fifth frame FR5 into the first area 901 from the imaging unit 432 (P1) and performs an FFT for this frame FR5 (P2). Subsequently, the moving amount calculating unit 433 acquires, from two frames FR2 and FR5 after the Fourier transform stored in the second area 902 and the first area 901, the product thereof and calculates a correlation coefficient by performing an IFFT for the product thereof (P3). The moving amount calculating unit 433 further calculates a sample SM2 of the moving amount from the peak of the correlation coefficient and outputs the sample SM2 (P4).

Thereafter, the moving amount calculating unit 433 repeats a process similar to those of the fourth period T4 and the fifth period T5. In this way, one sample is calculated for every consecutive four frames FR(3n−2), FR(3n−1), FR3n, and FR(3n+1).

As above, the moving amount calculating unit 433 increases the number of frames that can be stored in the FIFO area of the storage unit 434 in accordance with a decrease in the conveyance speed $v_S$ of a sheet. More specifically, the moving amount calculating unit 433 sets this number of frames to a value that is smaller than the ratio $v_{MAX}/v_T$ of the highest value $v_{MAX}$ to the target value $v_T$ of the conveyance speed $v_S$ by one, in other words, a value smaller than the imaging sequence difference Dif between two images having a sufficiently high possibility of detecting a displacement of the pattern of shades or speckles by "1": (the number of frames that can be stored in the FIFO area)=Ceil[$v_{MAX}/v_T$]−1=Dif−1. In addition, the moving amount calculating unit 433 sequentially performs input/output of a series of frames FR1, . . . for the storage unit 434, (Dif−1) frames each time by using the FIFO system in the middle of transmission of the series of frames from the first area 901 of the frame memory 501 to the second area 902. Accordingly, also in a case where the number of built-in processing systems is one, the moving amount calculating unit 433 can process the series of frames FR1, . . . per the sampling period Ps, two frames of which the frame numbers are different by the difference Dif at each time.

—Flow of Moving Amount Detecting Process—

Figure 12:
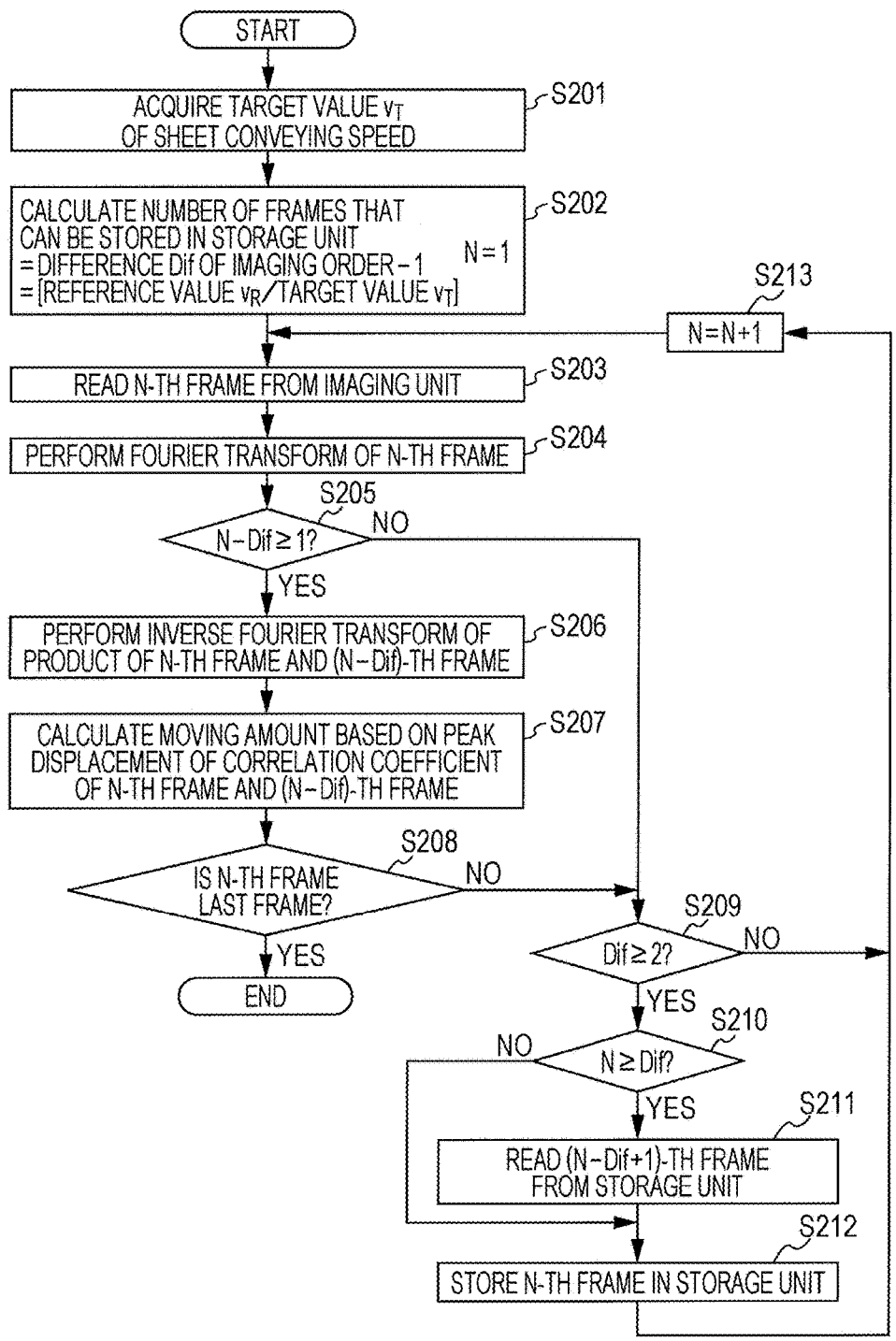
FIG. 12 is a flowchart of a moving amount detecting process using the storage unit illustrated in FIGS. 11A to 11C.

FIG. 12 is a flowchart of the moving amount detecting process using the storage unit 434 illustrated in FIGS. 11A to 11C. This process, similar to the process illustrated in FIG. 9A, is started when the control unit 430 of the moving amount sensor 400 is directed to monitor a sheet that is in the middle of conveyance from a subject of the conveyance control of a sheet such as the drive unit 20D of the image generating unit 20.

In Step S201, the moving amount calculating unit 433 acquires a target value $v_T$ of the conveyance speed $v_S$ of a sheet from the drive unit 20D of the image generating unit 20 or the like. Thereafter, the process proceeds to Step S202.

In Step S202, the moving amount calculating unit 433, first, acquires a minimum value among integers that are the ratio $v_{MAX}/v_T$ of the highest value $v_{MAX}$ to the target value $v_T$ of the conveyance speed $v_S$ of a sheet or more, in other words, an imaging sequence difference Dif between two images to be configured as a pair in the third process P3: Dif=Ceil[$v_{MAX}/v_T$]. The moving amount calculating unit 433 acquires this value Dif through calculation or reads this value Dif stored in advance from a storage unit that is built in the control unit 430. Next, the moving amount calculating unit 433 causes the storage unit 434 to secure a FIFO area in which frames up to the number frames that is smaller than the difference Dif by "1" can be stored. In a case where Dif=1, the moving amount calculating unit 433 does not request the storage unit 434 to secure the FIFO area. The moving amount calculating unit 433 initializes the integer-value variable N to "1": N=1. Thereafter, the process progresses to Step S203.

In Step S203, the moving amount calculating unit 433 reads an N-th frame into the frame memory 501 from the imaging unit 432 (P1). Thereafter, the process proceeds to Step S204.

In Step S204, the FFT unit 502 performs an FFT for the frame read into the frame memory 501 (P2). Thereafter, the process proceeds to Step S205.

In Step S205, the moving amount calculating unit 433 checks whether or not the variable N is larger than the difference Dif by "1" or more. In a case where the variable N is larger than the difference by "1" or more, the process proceeds to Step S206. On the other hand, in a case where the variable N is the difference Dif or less, the process proceeds to Step S209.

In Step S206, the variable N is larger than the difference Dif by "1" or more: N−Dif≥1. At this time, in the frame memory 501, a state is formed in which the N-th frame after the Fourier transform and the (N−Dif)-th frame are stored. Accordingly, the IFFT unit 503, from these two frames, acquires the product thereof and performs an IFFT for the product. In this way, a correlation coefficient between these two frames is calculated (P3). Thereafter, the process proceeds to Step S207.

In Step S207, the output unit 504 searches for a position at which the correlation coefficient calculated in Step S206 represents a peak and calculates a moving amount of a sheet from the position. This moving amount is transmitted to the drive unit 20D of the image generating unit 20 or the like as one sample. Thereafter, the process proceeds to Step S208.

In Step S208, the moving amount calculating unit 433 checks whether or not the N-th frame is the last frame by using the imaging unit 432. In the case of the last frame, the process ends. On the other hand, in the case of not the last frame, the process proceeds to Step S209.

In Step S209, the variable N is the difference Dif or less, or a frame having a frame number larger than the N-th frame remains in the imaging unit 432. Accordingly, the moving amount calculating unit 433 checks whether the difference Dif is "2" or more, in other words, whether or not the storage unit 434 secures the FIFO area. In a case where the difference Dif is "2" or more, the process proceeds to Step S210. On the other and, in a case where the difference Dif is less than "2", the process proceeds to Step S213.

In Step S210, since the difference Dif is "2" or more, the storage unit 434 secures the FIFO area. Accordingly, the moving amount calculating unit 433 checks whether or not the variable N is the difference Dif or more, in other words, whether or not the FIFO area of the storage unit 434 is full. In a case where the variable N is the difference Dif or more, the process proceeds to Step S211. On the other hand, in a case where the variable N is less than the difference Dif, the process proceeds to Step S212.

In Step S211, since the variable N is the difference Dif or more, the FIFO area of the storage unit 434 is full. Accordingly, the moving amount calculating unit 433 reads one frame from the FIFO area. In this way, the (N−Dif+1)-th frame that has been stored first among (Dif−1) frames inside the FIFO area is transmitted to the frame memory 501. Thereafter, the process proceeds to Step S212.

In Step S212, the moving amount calculating unit 433 stores the N-th frame in the FIFO area from the frame memory 501. Thereafter, the process proceeds to Step S213.

In Step S213, the moving amount calculating unit 433 increases the value of the variable N by "1": N=N+1. Thereafter, the process is repeated starting from Step S203.

<<Second Embodiment>>

An image forming apparatus according to the second embodiment of the present invention is an MFP that is similar to the MFP 100 according to the first embodiment. In the image forming apparatus according to the second embodiment, only a moving amount sensor is different from that of the first embodiment, and the other components are similar to those of the first embodiment. Thus, hereinafter, only different points will be described, and, for the same elements, the description of the first embodiment will be cited.

[Structure of Moving Amount Sensor]

The moving amount sensor according to the second embodiment is different from that 400 according to the first embodiment in that a control unit 430 includes a storage unit, and the other components are similar to those according to the first embodiment. The storage unit is a volatile semiconductor memory device such as DRAM or SRAM and can store sufficiently many frames generated by an imaging unit 432. A moving amount calculating unit 433, similar to that according to the first embodiment illustrated in FIG. 5B, includes a plurality of processing systems 501 to 504.

[Parallel Processing of Frame Performed by Moving Amount Sensor]

In a case where the target value $v_T$ of the conveyance speed is lower than the highest value $v_{MAX}$, the moving amount sensor 400 according to the first embodiment divides a series of images into a plurality of image rows. At this time, the moving amount sensor 400 arranges imaging sequence differences between consecutive two images in each image row to be uniform with respect to the ratio of the highest value $v_{MAX}$ to the target value $v_T$ of the conveyance speed. In addition, the moving amount sensor 400 calculates a moving amount of a sheet based on a difference between consecutive two images for each image row.

In contrast to this, the moving amount sensor according to the second embodiment repeats the comparison of two images among a series of images while increasing an imaging sequence difference between two images to be compared with each other. This moving amount sensor, particularly, continues to perform the repetition until a moving amount of a sheet is calculated based on a difference between two images to be significantly different from "0".

Figure 13:
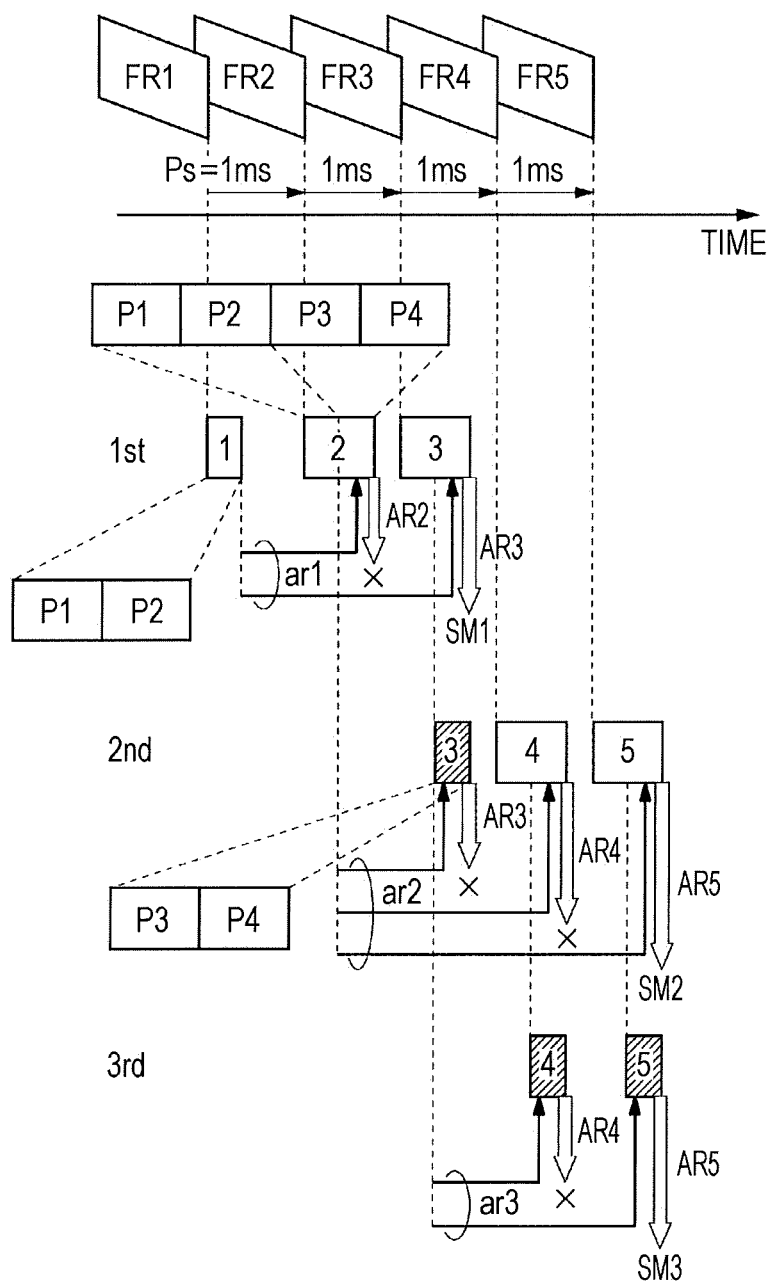
FIG. 13 is a schematic view that illustrates a parallel process performed by a moving amount calculating unit according to a second embodiment of the present invention for a series of images.

FIG. 13 is a schematic view that illustrates a parallel process performed by the moving amount calculating unit 433 according to the second embodiment for a series of frames FR1, FR2, . . . generated by the imaging unit 432. As illustrated in FIG. 13, an image capture interval represented by the series of frames FR1, . . . , in other words, the sampling period Ps, similar to the first embodiment, is maintained to a constant value, for example, 1 ms regardless of the conveyance speed of a sheet. A white rectangle represents the processing period of one frame completed by a series of processes P1 to P4. However, a first rectangle is an exception. The first rectangle represents only the processing period of two processes P1 and P2 of a first half among four processes. A rectangle covered with diagonal lines represents only the processing period of two processes P3 and P4 of a second half among the four processes. In addition, numbers "1", "2", . . . represented inside the rectangles represent frame numbers of processing targets. Each of thin arrows ar1, ar2, . . . binds a start point of the third process P3 for each frame and a time point when a frame to be paired with the frame in the process is copied to the storage unit, and each of thick arrows AR2, AR3, . . . represents an output of a result of the fourth process P4 for each frame.

As further illustrated in FIG. 13, the moving amount calculating unit 433, first, reads a first frame FR1 into the frame memory 501 of the first processing system 1st from the imaging unit 432 (P1) and causes the first processing system 1st to perform an FFT for this frame FR1 (P2). The first frame FR1 after the Fourier transform is copied to the storage unit.

Next, the moving amount calculating unit 433 reads a second frame FR2 into the frame memory 501 of the first processing system 1st from the imaging unit 432 (P1) and causes the first processing system 1st to perform an FFT for this frame FR2 (P2). The second frame FR2 after the Fourier transform is copied to the storage unit.

Subsequently, the moving amount calculating unit 433 causes the first processing system 1st to acquire, from two frames FR1 and FR2 after the Fourier transform, the product thereof (see the thin arrow ar1 illustrated in FIG. 13) and calculate a correlation coefficient by performing an IFFT for the product (P3). The moving amount calculating unit 433 further calculates a sample of the moving amount from the peak of the correlation coefficient (P4).

In the case illustrated in FIG. 13, this sample is substantially the same as "0", in other words, a difference between this sample and "0" is within a range of variations due to a noise, a measurement error, and the like. Accordingly, the moving amount calculating unit 433, first, prohibits the output of this sample that is performed by the first processing system 1st. In FIG. 13, this output prohibition is represented by a symbol "x" at the end of the thick arrow AR2. Next, the moving amount calculating unit 433 changes a target of which a correlation coefficient with the first frame FR1 is calculated from the second frame FR2 to the third frame FR3. More specifically, the moving amount calculating unit 433 reads the third frame FR3 in the area in which the second frame FR2 is stored in the frame memory 501 of the first processing system 1st from the imaging unit 432 (P1) and causes the first processing system 1st to perform an FFT for this frame FR3 (P2). The third frame FR3 after the Fourier transform is copied to the storage unit. Subsequently, the moving amount calculating unit 433 causes the first processing system 1st to acquire, from the two frames FR1 and FR3 after the Fourier transform, the product thereof (see the thin arrow ar1 illustrated in FIG. 13) and to calculate a correlation coefficient by performing an IFFT for the product (P3). In addition, the moving amount calculating unit 433 calculates a sample of the moving amount from a peak of the correlation coefficient (P4).

In the case illustrated in FIG. 13, this sample SM1 is significantly different from "0", and accordingly, the moving amount calculating unit 433 outputs this sample SM1 to the first processing system 1st (see the thick arrow AR3 illustrated in FIG. 13). In this way, since the calculation of the significant sample SM1 is successful from the first frame FR1, the moving amount calculating unit 433 removes the first frame FR1 from the storage unit.

In the process described above, at a time point when the third frame FR3 after the Fourier transform is copied to the storage unit, the moving amount can be calculated also from the second frame FR2 and the third frame FR3. Accordingly, the moving amount calculating unit 433, as follows, causes the second processing system 2nd to calculate a moving amount from the second frame FR2 and the following frames FR3, . . . in parallel with the process performed by the first processing system 1st described above.

The moving amount calculating unit 433 causes the second processing system 2nd to read the two frames FR2 and FR3 after the Fourier transform from the storage unit, acquires the product thereof (see the thin arrow ar2 illustrated in FIG. 13), and calculates a correlation coefficient by performing an IFFT for the product (P3). In addition, the moving amount calculating unit 433 calculates a sample of the moving amount from a peak of the correlation coefficient (P4).

In the case illustrated in FIG. 13, this sample is substantially the same as "0", accordingly, the moving amount calculating unit 433, first, prohibits the output of this sample that is performed by the second processing system 2nd (see the thick arrow AR3 illustrated in FIG. 13). Next, the moving amount calculating unit 433 changes a target of which a correlation coefficient with the second frame FR2 is calculated from the third frame FR3 to the fourth frame FR4. More specifically, the moving amount calculating unit 433, first, checks whether or not the fourth frame FR4 is stored in the storage unit. At this time point, since the fourth frame FR4 is not stored in the storage unit, the moving amount calculating unit 433 reads the fourth frame FR4 in the area in which the third frame FR3 is stored in the frame memory 501 of the second processing system 2nd from the imaging unit 432 (P1) and causes the second processing system 2nd to perform an FFT for this frame FR4 (P2). The fourth frame FR4 after the Fourier transform is copied to the storage unit. Subsequently, the moving amount calculating unit 433 causes the second processing system 2nd to acquire, from the two frames FR2 and FR4 after the Fourier transform, the product thereof (see the thin arrow ar2 illustrated in FIG. 13) and to calculate a correlation coefficient by performing an IFFT for the product (P3). In addition, the moving amount calculating unit 433 calculates a sample of the moving amount from a peak of the correlation coefficient (P4).

In the case illustrated in FIG. 13, this sample is also substantially the same as "0", accordingly, the moving amount calculating unit 433, first, prohibits the output of this sample that is performed by the second processing system 2nd (see the thick arrow AR4 illustrated in FIG. 13). Next, the moving amount calculating unit 433 changes a target of which a correlation coefficient with the second frame FR2 is calculated from the fourth frame FR4 to the fifth frame FR5. More specifically, the moving amount calculating unit 433, first, checks whether or not the fifth frame FR5 is stored in the storage unit. At this time point, since the fifth frame FR5 is not stored in the storage unit, the moving amount calculating unit 433 reads the fifth frame FR5 in the area in which the fourth frame FR4 is stored in the frame memory 501 of the second processing system 2nd from the imaging unit 432 (P1) and causes the second processing system 2nd to perform an FFT for this frame FR5 (P2). The fifth frame FR5 after the Fourier transform is copied to the storage unit. Subsequently, the moving amount calculating unit 433 causes the second processing system 2nd to acquire, from the two frames FR2 and FR5 after the Fourier transform, the product thereof (see the thin arrow ar2 illustrated in FIG. 13) and to calculate a correlation coefficient by performing an IFFT for the product (P3). In addition, the moving amount calculating unit 433 calculates a sample of the moving amount from a peak of the correlation coefficient (P4).

In the case illustrated in FIG. 13, this sample SM2 is significantly different from "0", and accordingly, the moving amount calculating unit 433 outputs this sample SM2 to the second processing system 2nd (see the thick arrow AR5 illustrated in FIG. 13). In this way, since the calculation of the significant sample SM2 is successful also from the second frame FR2, the moving amount calculating unit 433 removes the second frame FR2 from the storage unit.

In the process described above, at a time point when the fourth frame FR4 after the Fourier transform is copied to the storage unit, the moving amount can be calculated also from the third frame FR3 and the fourth frame FR4. Accordingly, the moving amount calculating unit 433, as follows, causes the third processing system 3rd to calculate a moving amount from the third frame FR3 and the following frames FR4, . . . in parallel with the processes performed by the first processing system 1st and the second processing system 2nd described above.

The moving amount calculating unit 433 causes the third processing system 3rd to read the two frames FR3 and FR4 after the Fourier transform from the storage unit, acquires the product thereof (see the thin arrow ar3 illustrated in FIG. 13), and calculates a correlation coefficient by performing an IFFT for the product (P3). In addition, the moving amount calculating unit 433 calculates a sample of the moving amount from a peak of the correlation coefficient (P4).

In the case illustrated in FIG. 13, this sample is substantially the same as "0", accordingly, the moving amount calculating unit 433, first, prohibits the output of this sample that is performed by the third processing system 3rd (see the thick arrow AR4 illustrated in FIG. 13). Next, the moving amount calculating unit 433 changes a target of which a correlation coefficient with the third frame FR3 is calculated from the fourth frame FR4 to the fifth frame FR5. More specifically, the moving amount calculating unit 433, first, checks whether or not the fifth frame FR5 is stored in the storage unit. At this time point, since the fifth frame FR5 is already stored in the storage unit, the moving amount calculating unit 433 reads the fifth frame FR5 in the area in which the fourth frame FR4 is stored in the frame memory 501 of the third processing system 3rd from the storage unit. Next, the moving amount calculating unit 433 causes the third processing system 3rd to acquire, from the two frames FR3 and FR5 after the Fourier transform, the product thereof (see the thin arrow ar3 illustrated in FIG. 13) and to calculate a correlation coefficient by performing an IFFT for the product (P3). In addition, the moving amount calculating unit 433 causes the third processing system 3rd to calculate a sample of the moving amount from a peak of the correlation coefficient (P4).

In the case illustrated in FIG. 13, this sample SM3 is significantly different from "0", and accordingly, the moving amount calculating unit 433 outputs this sample SM3 to the third processing system 3rd (see the thick arrow AR5 illustrated in FIG. 13). In this way, since the calculation of the significant sample SM3 is successful also from the third frame FR3, the moving amount calculating unit 433 removes the third frame FR3 from the storage unit.

As above, the moving amount calculating unit 433 repeats the process of calculating the moving amount of a sheet by comparing a series of frames FR1, . . . , two frames at each time while increasing an imaging sequence difference between two images to be compared with each other. Accordingly, also in a case where the sampling period Ps is shorter than the pixel traversing time Δt corresponding to the actual conveyance speed $v_S$ of the sheet, an imaging time difference between two images to be compared with each other can be increased until a sample that is significantly different from "0" is calculated. In this way, the moving amount sensor according to the second embodiment, similar to that 400 according to the first embodiment, calculates one sample of the moving amount of the sheet per the sampling period each time regardless of a decrease in the conveyance speed $v_S$ of the sheet. Particularly, anyone sample is significantly different from "0", the MFP 100 can maintain a response of the feedback control of the conveyance roller group based on such samples at a high speed regardless of a decrease in the conveyance speed of the sheet.

[Flow of Moving Amount Detecting Process]

Figure 14:
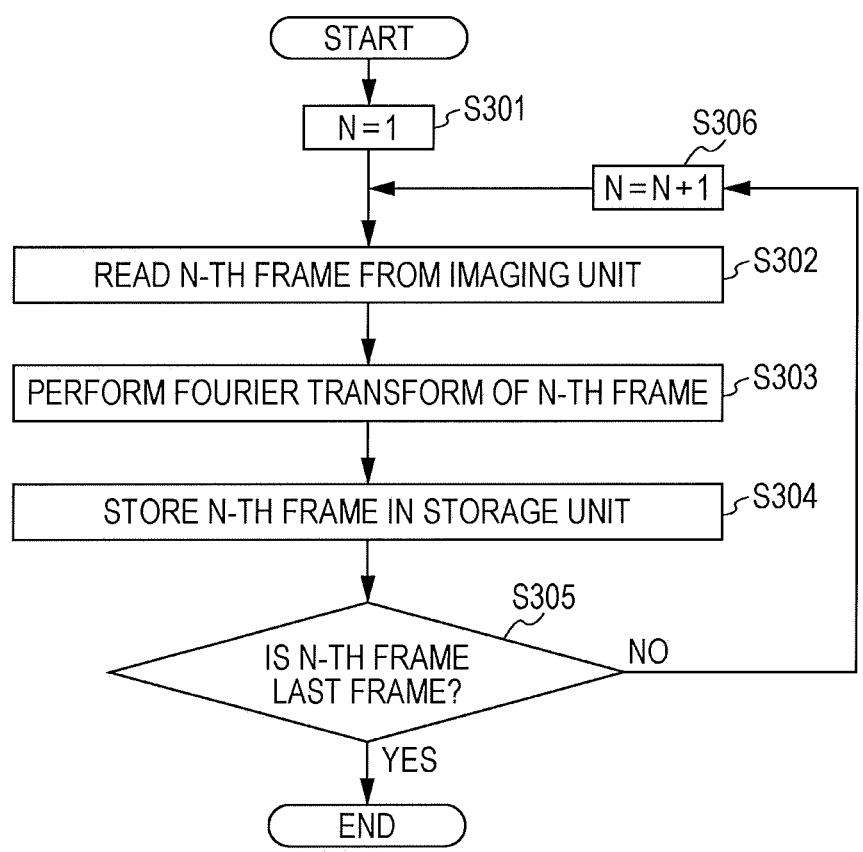
FIG. 14 is a flowchart of a part in which the moving amount calculating unit reads a series of frames from an imaging unit and performs an FFT for the frames in a moving amount detecting process using the parallel process illustrated in FIG. 13.

FIG. 14 is a flowchart of a part P1 and P2 in which the moving amount calculating unit 433 reads a series of frames FR1, . . . from the imaging unit 432 and performs an FFT for the frames in the moving amount detecting process using the parallel process illustrated in FIG. 13. For example, in a case where the moving amount sensor 400 is used as the timing sensor TS, this part is started when the control unit 430 is directed to monitor a sheet that is in the middle of conveyance from the drive unit 20D of the image generating unit 20.

In Step S301, the moving amount calculating unit 433 initializes the integer-value variable N to "1": N=1. Thereafter, the process proceeds to Step S302.

In Step S302, the moving amount calculating unit 433 reads an N-th frame into the frame memory 501 from the imaging unit 432 (P1). Thereafter, the process proceeds to Step S303.

In Step S303, the moving amount calculating unit 433 performs an FFT for the N-th frame by using the FFT unit 502 (P2). Thereafter, the process proceeds to Step S304.

In Step S304, the moving amount calculating unit 433 copies the N-th frame after the Fourier transform to the storage unit. Thereafter, the process proceeds to Step S305.

In Step S305, the moving amount calculating unit 433 checks whether or not the N-th frame is the last frame by using the imaging unit 432. In the case of the last frame, the process ends. On the other hand, in the case of not the last frame, the process proceeds to Step S306.

In Step S306, in the imaging unit 432, a frame of which the frame number is larger than that of the N-th frame remains. Accordingly, the moving amount calculating unit 433, first, increases the value of the variable N by "1": N=N+1. Thereafter, the process is repeated starting from Step S302.

Through the process illustrated in FIG. 14, when the imaging unit 432 generates one frame, the moving amount calculating unit 433 performs an FFT for the frame and stores a resultant frame in the storage unit. In other words, the first process P1 and the second process P2 for the series of frames are repeated at the sampling period Ps.

Figure 15:
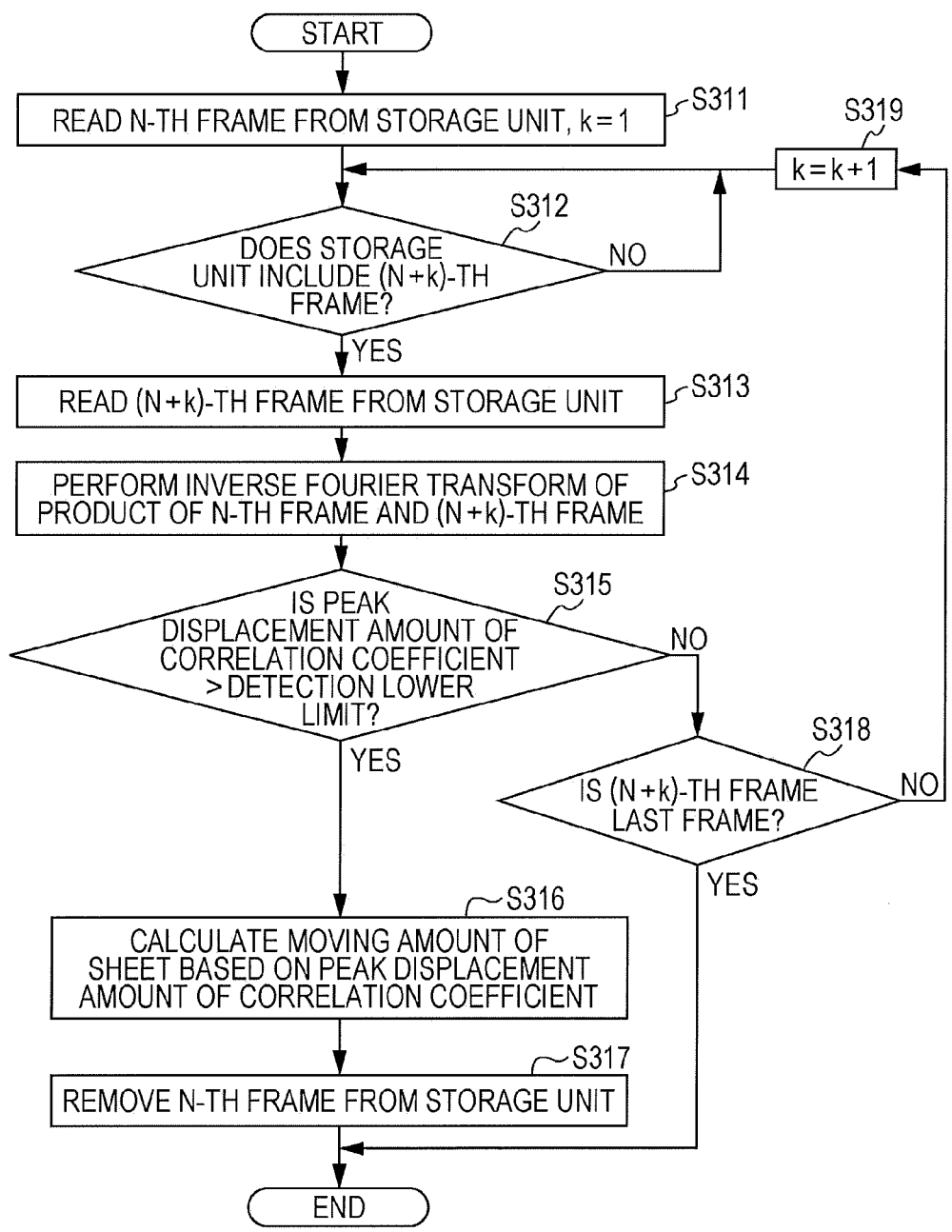
FIG. 15 is a flowchart of a part in which the moving amount calculating unit calculates a moving amount of a sheet from two frames in the moving amount detecting process using the parallel process illustrated in FIG. 13.

FIG. 15 is a flowchart of a part P3 and P4 in which the moving amount calculating unit 433 calculates a moving amount of a sheet from the N-th frame and the following frames in the moving amount detecting process using the parallel process illustrated in FIG. 13. This part is started when the moving amount calculating unit 433 checks that the N-th frame after the Fourier transform is not the last frame in Step S305 illustrated in FIG. 14.

In Step S311, the moving amount calculating unit 433 selects one available processing system and checks whether or not a state is formed in which the N-th frame after the Fourier transform is stored in the frame memory 501 of the processing system. In a case where the N-th frame has not been stored, the moving amount calculating unit 433 reads the N-th frame into the frame memory 501 from the storage unit. In addition, the moving amount calculating unit 433 initializes the integer-value variable k to "1": k=1. Thereafter, the process proceeds to Step S312.

In Step S312, the moving amount calculating unit 433 checks whether or not the (N+k)-th frame is in the state being stored in the storage unit. In the stored state, the process proceeds to Step S313. On the other hand, in a case where the frame has not been stored yet, the process repeats Step S312.

In Step S313, since the (N+k)-th frame is in the state being stored in the storage unit, the moving amount calculating unit 433 reads the (N+k)-th frame into the frame memory 501 of the processing system selected in Step S311 from the storage unit. Thereafter, the process proceeds to Step S314.

In Step S314, the moving amount calculating unit 433 causes the IFFT unit 503 of the processing system to calculate, from the N-th frame and the (N+k)-th frame after the Fourier transform stored in the frame memory 501, the product thereof and to perform an IFFT for this product. In this way, a correlation coefficient between the two frames is calculated (P3). Thereafter, the process proceeds to Step S315.

In Step S315, the moving amount calculating unit 433, first, causes the output unit 504 of the processing system to search for a position at which the correlation coefficient calculated in Step S314 represents a peak and calculate the moving amount of the sheet from that position. Next, the moving amount calculating unit 433 checks whether a displacement amount σ with respect to the origin point of the peak is significantly different from "0", more specifically, for example, whether or not the displacement amount σ exceeds the detection lower limit, in other words, the pixel size of the imaging device 421. In a case where the displacement amount σ is significantly different from "0", the process proceeds to Step S316. On the other hand, in a case where the displacement amount σ is substantially the same as "0", the process proceeds to Step S318.

In Step S316, since the displacement amount σ of the peak of the correlation coefficient is significantly different from "0", the moving amount calculating unit 433 causes the output unit 504 to calculate the moving amount of the sheet from the displacement amount σ and transmit this moving amount to the drive unit 20D of the image generating unit 20 (P4). Thereafter, the process proceeds to Step S317.

In Step S317, since the calculation of a significant sample from the N-th frame is successful, the moving amount calculating unit 433 removes the N-th frame from the storage unit. Thereafter, the process ends.

In Step S318, the displacement amount σ of the peak of the correlation coefficient is substantially the same as "0". In this case, the moving amount calculating unit 433 checks whether or not the (N+k)-th frame is the last frame by using the imaging unit 432. In the case of the last frame, the process ends. On the other hand, in the case of not the last frame, the process proceeds to Step S319.

In Step S319, a frame having a frame number larger than the (N+k)-th frame remains in the imaging unit 432. Accordingly, the moving amount calculating unit 433 increases the value of the variable k by "1": k=k+1. Thereafter, the process is repeated from Step S312, and, particularly, in the third process P3, an imaging sequence difference between the N-th frame and an image in which a following frame that is a comparison target appears is increased by one frame.

As can be understood from FIG. 13, generally, a plurality of processing systems perform the process illustrated in FIG. 15 for mutually-different frames in parallel with each other. Accordingly, also in a case where the sampling period Ps is shorter than the actual pixel traversing time Δt, an imaging time difference between images in which two frames to be compared with each other appear can be increased until a significant moving amount of the sheet is calculated.

[Advantages of Second Embodiment]

The moving amount sensor 400 according to the second embodiment of the present invention, as described repeats the comparison of a series of captured images (more specifically, a series of frames FR1, . . . , two images at each time in the state in which the sampling period Ps is maintained to a constant value regardless of the conveyance speed of the sheet while increasing an imaging sequence difference between two images to be compared with each other. In this case, also in a case where the sampling period Ps is shorter than the actual pixel traversing time Δt, until the moving amount of the sheet is calculated to be a value significantly different form "0" based on a difference (more specifically, a peak displacement of the correlation coefficient of the brightness distribution) between two images, an imaging time difference between the two images to be compared with each other can be increased. In this way, the moving amount sensor 400 can calculate one sample of the moving amount substantially matching the sampling period Ps regardless of the conveyance speed of the sheet. As a result, regardless of a decrease in the conveyance speed of the sheet, a time required for receiving feedbacks of significant samples corresponding to a constant number is substantially not changed, and accordingly, the MFP 100 can maintain the response of the feedback control of the timing roller 27 at a high speed.

[Modified Example]

The modified example of the first embodiment can be applied to a modified example of the second embodiment except for items (C) and (H).

(I) As illustrated in FIGS. 13 and 15, the moving amount calculating unit 433 starts the comparison between the N-th frame and the following frame from the (N+1)-th frame. Alternatively, the moving amount calculating unit 433 may start the comparison from a frame representing an image of which the imaging sequence lags from an image represented by the N-th frame by a lower limit corresponding to the target value of the conveyance speed of the sheet.

Figure 16:
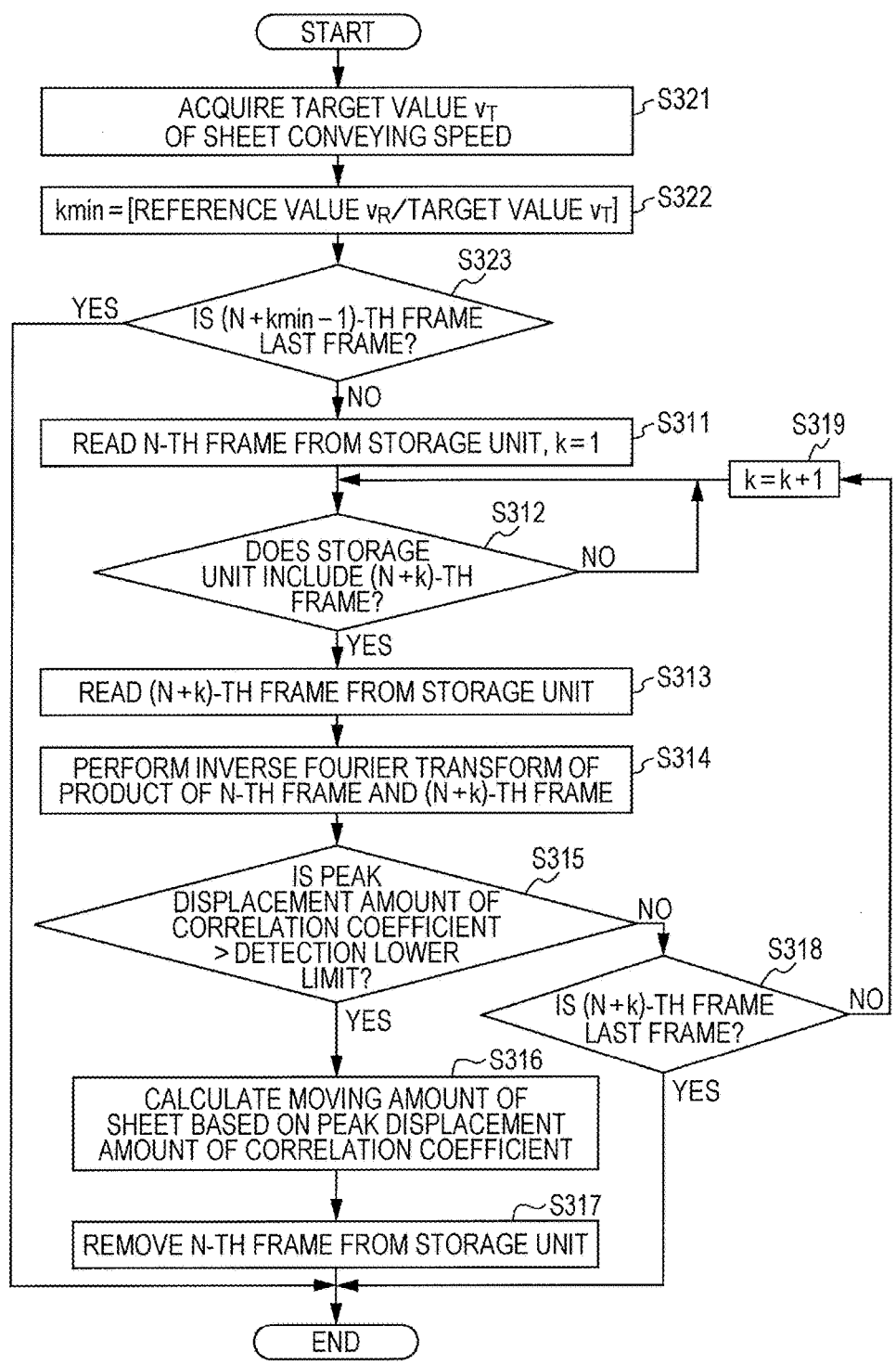
FIG. 16 is a flowchart that illustrates a modified example of a part in which the moving amount calculating unit calculates a moving amount of a sheet from two frames in the moving amount detecting process using the parallel process illustrated in FIG. 13.

FIG. 16 is a flowchart that illustrates an example of a case where the process according to the second embodiment illustrated in FIG. 15 is modified as such. This process is different from the process illustrated in FIG. 15 only in that Steps S321 to S323 are included before Step S311.

In Step S321, the moving amount calculating unit 433 acquires a target value $v_T$ of the conveyance speed of a sheet from the drive unit 20D of the image generating unit 20. Thereafter, the process proceeds to Step S322.

In Step S322, the moving amount calculating unit 433 acquires a minimum value $k_{min}$ among integers equal to or more than a ratio $v_{MAX}/v_T$ of a reference value $v_R$, for example, a highest value $v_{MAX}$ that can be set as a target value to the target value $v_T$ of the conveyance speed of the sheet, in other words, an imaging sequence difference between two images having a sufficiently high possibility of detecting the displacement of the pattern of shades or speckles: $k_{min}=\text{Ceil}[v_{MAX}/v_T]$. Thereafter, the process proceeds to Step S323.

In Step S323, the moving amount calculating unit 433 checks whether or not the (N+$k_{min}$−1)-th frame is the last frame by using the imaging unit 432. In the case of the last frame, the process ends. On the other hand, in the case of not the last frame, the process proceeds to Step S311.

The process after Step S311 is completely the same as Steps S311 to S319 illustrated in FIG. 15, and thus, the description for FIG. 15 is applied as details thereof.

In this way, the moving amount calculating unit 433 starts the comparison of the N-th frame with the following frame from the (N+$k_{min}$−1)-th frame. Between two images represented by this frame and the N-th frame, an imaging time difference is the same as the pixel traversing time corresponding to the target value of the conveyance speed of the sheet. Accordingly, there is a sufficiently high possibility that the moving amount of the sheet is detected as a value that is significantly different from "0" based on a difference between the two images. In this way, the moving amount sensor 400 can calculate a sample having a significant moving amount of the sheet from the N-th frame and the following frame.

(J) In the case illustrated in FIG. 13, also in a case where the time point at which the comparison between the third frame and the following frame is started is after successful calculation of the sample SM1 that is significant from the first frame, the moving amount calculating unit 433 may start the comparison from the fourth frame that is immediately after the third frame. Alternatively, in a case where the calculation of a significant sample is successful based on the N-th frame and the (N+n)-th frame (n: an integer of one or more), the moving amount calculating unit 433 may start the comparison between another frame starting after the successful time point and the following frame from a frame of which the imaging sequence represents an image that is after n images in the imaging sequence from the image represented by the another frame. Between images represented by the N-th frame and the (N+n)-th frame, an imaging time difference can be regarded to be the same as the pixel traversing time. Accordingly, based on a difference between images having n images as an imaging sequence difference, there is a sufficiently high possibility that the moving amount of the sheet is detected to be a value that is significantly different from "0". In this way, the moving amount sensor 400 can calculate a sample of which the moving amount of the sheet is significant at a higher speed.

(K) Both the moving amount sensors 400 according to the first and second embodiments selects two images to be compared with each other from among a series of images in the state in which sampling period Ps is maintained to be constant regardless of a decrease in the conveyance speed of the sheet such that an image time difference therebetween is increased. This selection may be stopped by the moving amount calculating unit 433 in accordance with the operation condition of the MFP 100. More specifically, in accordance with a user's operation received by the operation unit 50 of the MFP 100 or based on information maintained by the main control unit 60 of the MFP 100, the moving amount calculating unit 433 may fix an imaging time difference between two images to be compared with each other among a series of images captured by the imaging unit 432. Here, the "user" represents not only a person who uses the MFP 100 for processing a job such as printing but also an operating staff who is responsible for the maintenance of the MFP 100. In addition, the "information maintained by the main control unit 60", for example, represents at least one of information relating to the image quality of a toner image, information relating to the power consumption of the MFP 100, or information relating to the size of a sheet on which a toner image is to be formed.

As the operation condition of the MFP 100 for which the selection described above is to be stopped, for example, the followings may be considered.

(A) a case where a request for the image quality of a toner image is not high, (B) power saving has priority, and (C) the length of a sheet that is a printing target is less than a predetermined value.

(A) The selection described above has an advantage for the implementation of high image quality of a toner image. For example, in a case where the moving amount sensor 400 is used as the timing sensor TS, the timing sensor TS detects the moving amount of the sheet sent out by the timing roller 27 with high accuracy at a high speed and feeds back the moving amount to the drive unit 20D of the image generating unit 20. From this moving amount, since the position or the speed of the sheet is calculated with high accuracy in the real time, the accuracy of the rotation control of the timing roller 27 is improved. As a result, the timing and the speed at which the timing roller 27 passes the sheet to the nip between the intermediate transfer belt 23 and the secondary transfer roller 24 match the timing and the speed at which the toner image on the intermediate transfer belt 23 passes the nip. Accordingly, both the accuracy of the transfer position of the toner image on the sheet and the image quality of the toner image are improved.

To the contrary, this means that, in a case where the request for the image quality of a toner image is not high, the moving amount sensor 400 may stop the selection described above. For example, in test printing performed during a maintenance operation of the MFP 100, there are cases where test items can be checked for low image quality. In such a case, the operating staff may decrease a burden accompanied with the monitoring operation by causing the moving amount sensor 400 to stop the selection described above. In addition, it may be configured such that, when the MFP 100 starts a print job, the moving amount sensor 400 automatically acquires information relating to the image quality of a toner image of a printing target from the main control unit 60, automatically stops the selection in a case where the information does not request for a high image quality mode, whereby the burden of own device accompanying the monitoring operation may be reduced.

(B) The selection described above is disadvantageous for power saving. Actually, in the selection described above, since the moving amount sensor 400 maintains the sampling period Ps to be constant regardless of the conveyance speed of the sheet, the number of times of imaging performed by the imaging unit 432 is more than that of a case where the sampling period is lengthened according to the conveyance speed. Mainly, as a result of this, in a case where the selection described above is performed, it is difficult for the moving amount sensor 400 to decrease the power consumption.

Accordingly, in a case where a user has a preference for a decrease in the power consumption over the image quality, the moving amount sensor 400 may allow the user to set the stopping of the selection through the operation unit 50 of the MFP 100. In addition, in a case where the moving amount sensor 400 automatically acquires information relating to the power consumption of the MFP 100 from the main control unit 60, and the information represents a low-power mode setting, the moving amount sensor 400 may automatically stop the selection for decreasing the power consumption of the own device.

(C) For the purpose of improving the detection accuracy of the moving amount of the sheet, the moving amount sensor 400 may accumulate a predetermined number of moving amounts detected from one sheet and feed back an average value thereof to the drive unit 20D of the image generating unit 20 or the like as one sample (see item (F) of the modified example). However, in this case, when the sheet is not longer than a predetermined value, a time for which the sheet passes through the monitoring region MNR (see FIG. 5A) of the moving amount sensor 400 is too short, and the number of samples that can improve the detection accuracy cannot be accumulated.

Thus, in a case where the length of the sheet that is a printing target is below a predetermined value, the moving amount sensor 400 may allow a user to set the stopping of the selection through the operation unit 50 of the MFP 100 and decrease the burden accompanied with the monitoring operation. In addition, the moving amount sensor 400 may automatically acquire the information relating to the size of the sheet that is a printing target from the main control unit 60 and automatically stop the selection in a case where the length of the sheet represented by the information is below a predetermined value for decreasing the burden of own device accompanied with the monitoring operation.

The present invention relates to a technology for detecting a moving amount of a movable member or an object and, as described above, two images to be compared with each other are selected from among a series of images that are consecutively captured at a predetermined sampling period such that an imaging time difference is increased therebetween as a difference due to moving of a detection target therebetween increases. In this way, it is apparent that the present invention is applicable to the industries.

According to an embodiment of the present invention, a moving amount detector repeatedly captures images of the detection target at a constant sampling period while the detection target moves and selects two images to be compared with each other among the obtained series of images such that an imaging time difference between the two images is increased as a difference due to moving of the detection target is further generated between the two images. Accordingly, also in a case where a sampling period is below a moving time of a size of a pixel or the like according to the detection target in accordance with a decrease in the moving speed of the detection target, this moving amount detector can detect the moving amount of the detection target while maintaining the sampling period to be constant. In this way, since the detection of the moving amount is maintained at a high speed regardless of the moving speed of the detection target, the moving amount detector can improve the responsiveness of the control in a device of the mounting destination.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A moving amount detector that sets a movable member included in a device or an object conveyed by the device as a detection target and detects a moving amount of the detection target, the moving amount detector comprising:
   an imaging unit that repeatedly captures a series of images of the detection target at a constant sampling period while the detection target moves; and
   a hardware processor configured to function as a moving amount calculating unit that selects every Nth image of the series of images and compares each pair of adjacent selected images with each other from among the series of images of the detection target captured by the imaging unit;
   wherein N is determined based on an intended moving speed of the detection target; and
   the moving amount calculating unit calculates a moving amount of the detection target based on a movement of the detection target during a time period between when the two compared images were taken.

2. The moving amount detector according to claim 1, wherein the moving amount calculating unit acquires information relating to the intended moving speed of the detection target from the device, and determines N as an integer of one or more.

3. The moving amount detector according to claim 2, wherein the sampling period represents a time required for an image of the detection target to move by a size of one pixel or one sub pixel inside the imaging unit in a case where the moving speed of the detection target is a reference value, and the moving amount calculating unit acquires a ratio of the reference value to a target value by decoding the target value of the moving speed of the detection target from the information and sets a minimum value among integers of the ratio or more as the integer of one or more.

4. The moving amount detector according to claim 2, wherein the moving amount calculating unit divides the series of images into image rows corresponding to a same number as the integer of one or more such that images having imaging sequences that are different from each other by each the integer of one or more belong to a same row and calculates the moving amount of the detection target based on a difference between consecutive two images in each of the image rows.

5. The moving amount detector according to claim 2, wherein the moving amount calculating unit further includes a storage unit that stores the series of images corresponding to a value acquired by decreasing the integer of one or more by one in an imaging sequence.

6. The moving amount detector according to claim 1, wherein the moving amount calculating unit repeats comparison of the series of images, two images at each time, while an imaging sequence difference between the two images to be compared with each other is increased.

7. The moving amount detector according to claim 6, wherein the moving amount calculating unit acquires information relating to the intended moving speed of the detection target from the device and increases an imaging sequence difference between the two images to be compared with each other among the series of images from a lower limit corresponding to a moving speed represented by the information.

8. The moving amount detector according to claim 7, wherein the sampling period represents a time required for an image of the detection target to move by a size of one pixel or one sub pixel inside the imaging unit in a case where the moving speed of the detection target is a reference value, and the moving amount calculating unit acquires a ratio of the reference value to a target value by decoding the target value of the moving speed of the detection target from the information and sets a minimum value among integers of the ratio or more as the lower limit of the imaging sequence difference.

9. The moving amount detector according to claim 8, wherein the moving amount calculating unit, in a case where calculation of a value that is significantly different from "0" is successful as the moving amount of the detection target based on a difference between two images included in the series of images, updates the lower limit with the imaging sequence difference between the two images.

10. The moving amount detector according to claim 1, wherein the moving amount calculating unit fixes an imaging time difference between two images to be compared with each other among the series of images in accordance with a user's operation received by the device.

11. An image forming apparatus comprising:
a conveyance unit that conveys a sheet;
an image generating unit that forms a toner image on an image carrying rotary body and transfers the toner image from the image carrying rotary body onto the sheet conveyed by the conveyance unit;

a moving amount detector that detects a moving amount of the sheet conveyed by the conveyance unit or a rotation amount of the image carrying rotary body; and a control unit that controls the conveyance unit or the image generating unit based on the moving amount or the rotation amount detected by the moving amount detector, the moving amount detector including:
an imaging unit that repeatedly captures a series of images of the sheet conveyed by the conveyance unit or the image carrying rotary body at a constant sampling period while the sheet conveyed by the conveyance unit or the image carrying rotary body is moved, and a hardware processor configured to function as a moving amount calculating unit that selects every Nth image of the series of images and compares each pair of adjacent selected images with each other from among the series of images of the sheet conveyed by the conveyance unit or the image carrying rotary body captured by the imaging unit, wherein N is determined based on an intended moving speed of the sheet conveyed by the conveyance unit or the image carrying rotary body; and the moving amount calculating unit calculates a moving amount of the sheet conveyed by the conveyance unit or the image carrying rotary body based on a movement of the sheet conveyed by the conveyance unit or the image carrying rotary body during a time period between when the two compared images were taken.

12. The image forming apparatus according to claim 11, wherein the control unit maintains at least one of information relating to image quality of the toner image, information relating to power consumption of the image forming apparatus, and information relating to a size of the sheet on which the toner image is to be formed, and the moving amount calculating unit fixes the imaging time difference between the two images to be compared with each other among the series of images in accordance with the information maintained by the control unit.

13. The image forming apparatus according to claim 11, wherein the moving amount calculating unit acquires information relating to the intended moving speed of the detection target from the apparatus, and determines N as an integer of one or more.

14. The image forming apparatus according to claim 11, wherein the moving amount calculating unit repeats comparison of the series of images, two images at each time while increasing the imaging sequence difference between the two images to be compared with each other.

15. A method of detecting a moving amount for setting a movable member included in a device or an object conveyed by the device as a detection target and detecting a moving amount of the detection target, the method comprising:

repeatedly capturing a series of images of the detection target at a constant sampling period while the detection target moves; and selecting every Nth image of the series of images and comparing each pair of adjacent selected images with each other among the series of images of the detection target captured in the repeatedly capturing of images of the detection target, wherein N is determined based on an intended moving speed of the detection target; and calculating a moving amount of the detection target based on a movement of the detection target during a time period between when the two compared images were taken.

16. The method of detecting a moving amount according to claim 15, wherein the calculating of the moving amount includes:
   acquiring information relating to the intended moving speed of the detection target from the device;
   determining N as an integer of one or more.

17. The method of detecting a moving amount according to claim 15, wherein, in the calculating of the moving amount, comparison of the series of images, two images at each time is repeated, while increasing the imaging sequence difference between the two images to be compared with each other.

18. A non-transitory recording medium storing a computer readable program causing a computer to perform a process of setting a movable member included in a device or an object conveyed by the device as a detection target and detecting a moving amount of the detection target, the process comprising:
   repeatedly capturing a series of images of the detection target at a constant sampling period while the detection target moves; and
   selecting every Nth image of the series of images and comparing each pair of adjacent selected images with each other among the series of images of the detection target captured in the repeatedly capturing of images of the detection target;
   wherein N is determined based on an intended moving speed of the detection target; and
   calculating a moving amount of the detection target based on a movement of the detection target during a time period between when the two compared images were taken.

19. The non-transitory recording medium storing a computer readable program according to claim 18, wherein the calculating of the moving amount includes
   acquiring information relating to the intended moving speed of the detection target from the device;
   determining N as an integer of one or more.

20. The non-transitory recording medium storing a computer readable program according to claim 18, wherein, in the calculating of the moving amount, comparison of the series of images, two images at each time is repeated while increasing the imaging sequence difference between the two images to be compared with each other.

* * * * *